(12) United States Patent
Kubota et al.

(10) Patent No.: US 7,204,593 B2
(45) Date of Patent: Apr. 17, 2007

(54) 3-D IMAGE DISPLAY UNIT

(75) Inventors: Shigeo Kubota, Kanagawa (JP); Toshitaka Kawashima, Kanagawa (JP); Junichi Ohsako, Tokyo (JP); Naoya Eguchi, Kanagawa (JP)

(73) Assignee: Sony Corporation (JP)

( * ) Notice: Subject to any disclaimer, the term of this patent is extended or adjusted under 35 U.S.C. 154(b) by 236 days.

(21) Appl. No.: 10/502,733

(22) PCT Filed: Dec. 2, 2003

(86) PCT No.: PCT/JP03/15422

§ 371 (c)(1),
(2), (4) Date: Jul. 28, 2004

(87) PCT Pub. No.: WO2004/051345

PCT Pub. Date: Jun. 17, 2004

(65) Prior Publication Data

US 2005/0225629 A1    Oct. 13, 2005

(30) Foreign Application Priority Data

Dec. 2, 2002  (JP)  .............................. 2002-350147

(51) Int. Cl.
*G03B 21/00* (2006.01)
*G02B 26/00* (2006.01)

(52) U.S. Cl. .......................................... 353/7; 359/290

(58) Field of Classification Search ............ 359/9, 359/196, 197, 212, 237, 247, 290, 291, 292, 359/625; 348/40, 51; 353/7
See application file for complete search history.

(56) References Cited

U.S. PATENT DOCUMENTS

| 5,585,960 | A  |   | 12/1996 | Sato et al. |
| 7,046,447 | B2 | * | 5/2006  | Raber ........................ 359/625 |
| 2002/0145806 | A1 | * | 10/2002 | Amm ......................... 359/618 |
| 2003/0223043 | A1 | * | 12/2003 | Yoshino ...................... 353/10 |

FOREIGN PATENT DOCUMENTS

| JP | 7-209594 A | 8/1995 |
| JP | 2002-341269 A | 11/2002 |

OTHER PUBLICATIONS

International Search Report dated Jun. 20, 2004.

* cited by examiner

*Primary Examiner*—Rodney Fuller
(74) *Attorney, Agent, or Firm*—Rader Fishman & Grauer PLLC; Ronald P. Kananen

(57) ABSTRACT

The three-dimensional image display apparatus of the present invention includes an optical modulator array which modulates the light intensity of an incident light to be an image signal light and an optical deflector array which shifts an image focusing position of each pixel light from the optical modulator array in the direction of an optical axis to form a three-dimensional section image, wherein the optical modulator array is formed of a diffractive type array in which a plurality of light reflective films are driven and correspond to a light of one pixel and the optical reflector array is formed of an array in which a plurality of light reflective films are driven and correspond to a light of one pixel.

8 Claims, 17 Drawing Sheets

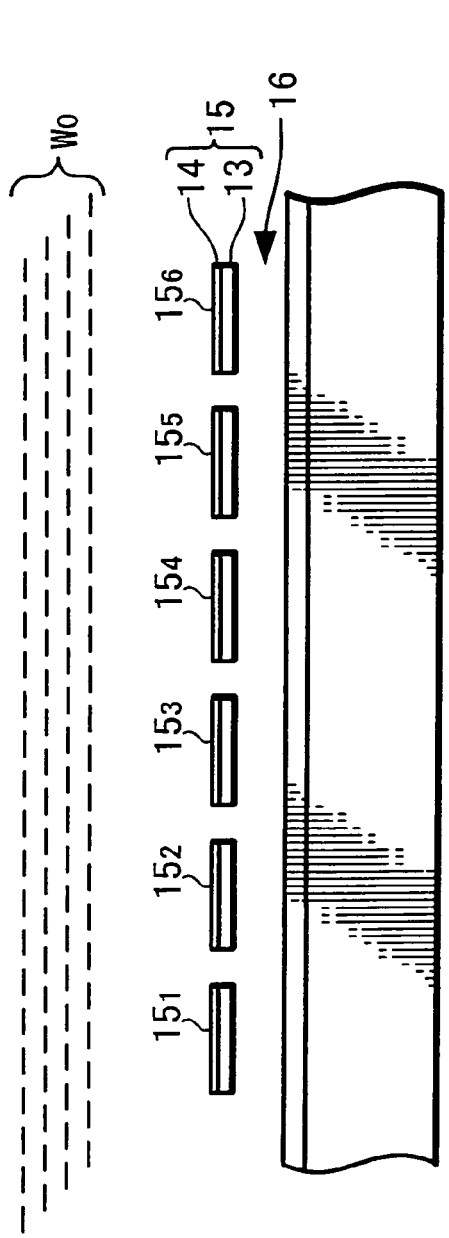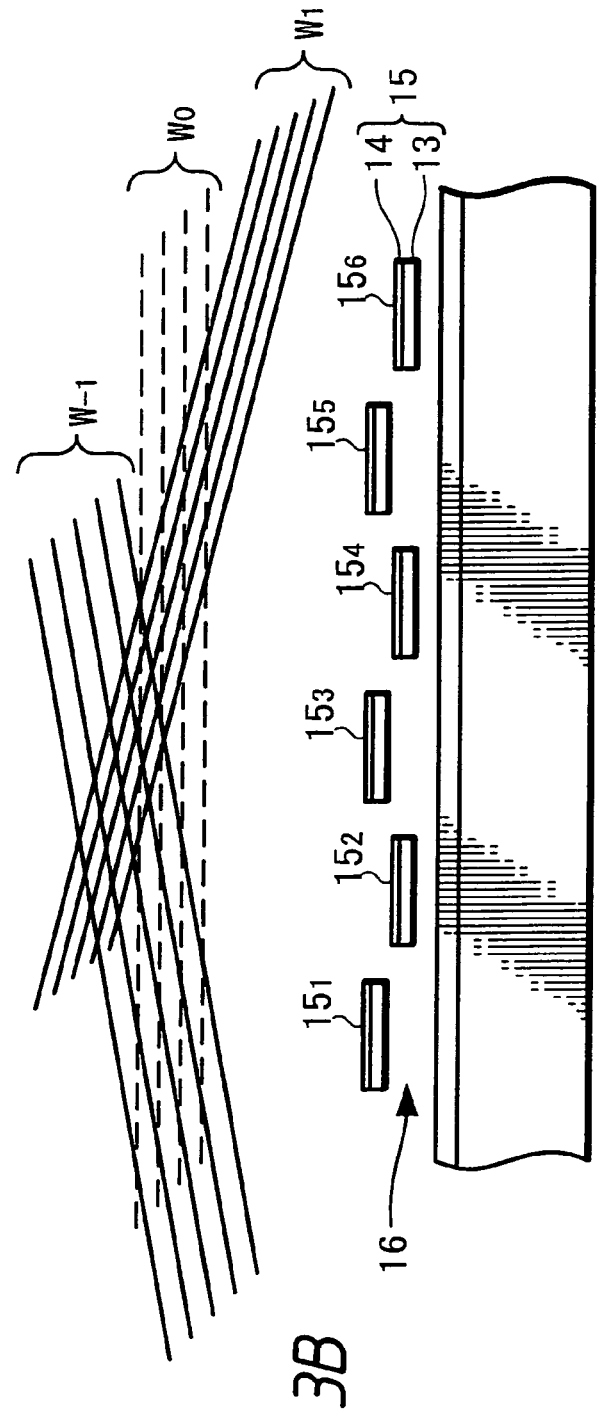

FIG. 19
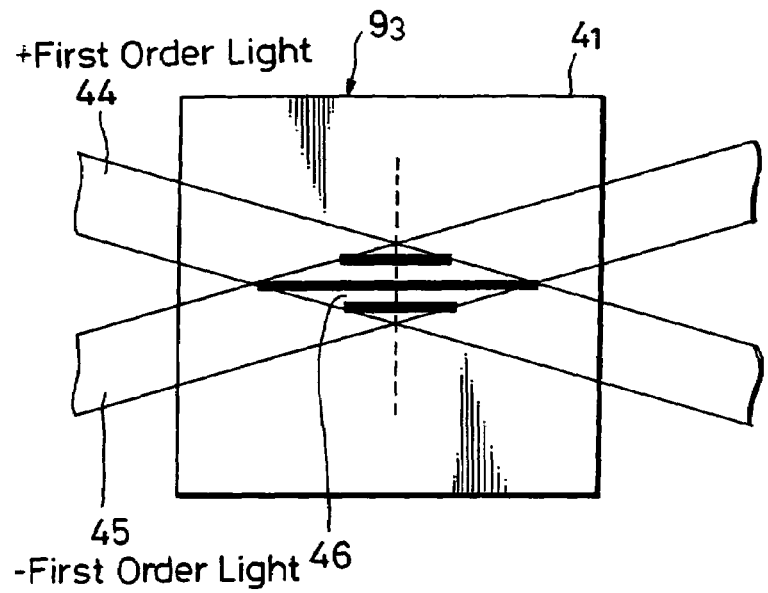
Scannig Direction Vertical to The Drawing
FIG. 20
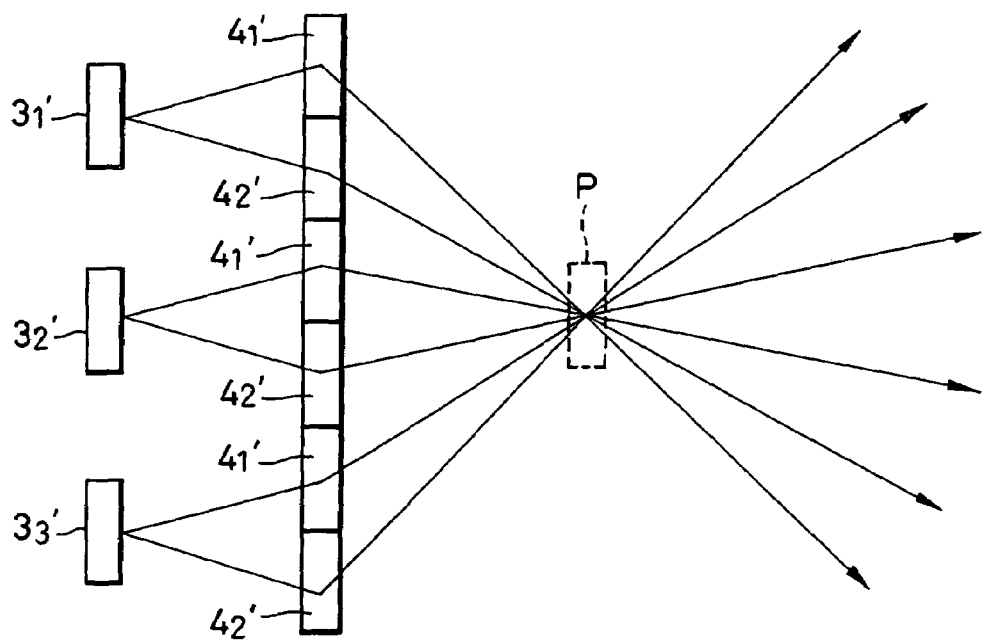

3-D IMAGE DISPLAY UNIT

TECHNICAL FIELD

The present invention relates to a three-dimensional image display apparatus which displays a three-dimensional moving image, a three-dimensional still image and the like, particularly to a three-dimensional image display apparatus which uses image signal light beams of three primary colors and includes an optical modulator array and an optical deflector array.

BACKGROUND ART

Conventionally, those which are described in patent references 1 and 2 are known as three-dimensional image display apparatuses to display a three-dimensional moving image. Each of those technologies aims to reproduce a three-dimensional image by using a laser as a light source. First, the technology of the patent reference 1 basically uses a progressive wave type acousto-optical modulator (AOM) made of TeO$_2$ crystal as an optical modulator to be scanned by a mirror. The technology of the patent reference 2 uses an acousto-optical modulator (AOM) as the optical modulator and uses the TeO$_2$ crystal as a means for an optical deflector.

In the technology of the patent reference 1, recording and reproduction of a real time hologram are performed in the progressive wave type acousto-optical modulator (AOM) so as to generate the three-dimensional image. In the technology of the patent reference 2, the three-dimensional image is generated directly. Although the technology of the patent reference 2 may be called a pseudo-hologram, a process of generating the three-dimensional image does not actually include a process of producing the hologram in a substance.

On the other hand, a technology relating to an a focal lens system which is applied to recording or observation of a three-dimensional visual image is described in a patent reference 3.

[Patent reference 1]
U.S. Pat. No. 5,172,251 specification
[Patent reference 2]
U.S. Pat. No. 6,201,565 specification
[Patent reference 3]
Japanese Translation of PCT International Application No. H4-28091 gazette

DISCLOSURE OF THE INVENTION

The present invention is to provide a new three-dimensional image display apparatus which enables three-dimensional images of a moving image, a still image and the like to be directly generated without using a hologram technology.

The three-dimensional image display apparatus according to the present invention includes an optical modulator array to modulate a light intensity of an incident light which becomes an image signal light and an optical deflector array to form a three-dimensional section image by shifting an image focusing position of each pixel light from the optical modulator array in the direction of an optical axis, in which the optical modulator array is formed of a diffraction type array where a plurality of light reflective films are driven and correspond to light of one pixel and the optical deflector array is formed of an array where a plurality of light reflective films are driven and correspond to light of one pixel.

This three-dimensional image display apparatus has a scanning mirror means for scanning the three-dimensional section image to generate the three-dimensional image. Further, a means for visualizing the three-dimensional image is provided.

The means for visualizing the three-dimensional image can be composed of, for example, a Fresnel lens for telecentrically focusing a pixel of the three-dimensional image and a micro-lens array disposed in the vicinity of a mean image plane at a pitch equal to a magnified image of the pixel. Further, the means for visualizing the three-dimensional image can be composed of a Fresnel lens for telecentrically focusing a pixel of the three-dimensional image and a scatterer disposed in the vicinity of the mean image plane. Furthermore, the means for visualizing the three-dimensional image can be composed of a photo-refractive member disposed in the vicinity of the three-dimensional section image which is focused by an optical deflector array. Furthermore, the means for visualizing the three-dimensional image can be composed of an optical modulator array where a plurality of optical modulators performing common amplitude modulation correspond to one pixel, and an optical deflector array where an optical deflector corresponds to each of the plurality of optical modulators, in which images of the plurality of pixels from the respective optical modulators can be made to coincide by the above described optical deflector.

Moreover, in the present invention the optical modulator array can be a one-dimensional array, in which the one-dimensional optical modulator array is disposed such that information in the horizontal direction of the three-dimensional image is made to enter; and a scanning mirror means is disposed such that the three-dimensional section image is scanned in the vertical direction of a display screen.

In the three-dimensional image display apparatus according to the present invention, the optical modulator array is formed of a diffraction type array and the light intensity of light which becomes the image signal light is modulated by this diffraction type array. Plus and minus first order diffraction light of the modulated light is reflected and deflected by the optical deflector array and the image focusing position shifts in the direction of the optical axis to form the three dimensional section image. The three-dimensional image can be obtained based on this three dimensional section image. Information on light intensity of image signals is inputted into the optical modulator array and information on depth of the image signals is inputted into the optical deflector array. Accordingly, when image signals varying with time are inputted into the optical modulator array and the optical deflector array respectively, a three-dimensional moving image can be obtained. When image signals not varying with time are inputted into the optical modulator array and the optical deflector array respectively, a three-dimensional still image can be obtained.

By providing a scanning mirror means, the three-dimensional section image is scanned in one direction and is displayed as the three-dimensional image. By providing the means for visualizing the three-dimensional image, a diffusion angle is expanded and an observation of the three-dimensional image is ascertained.

When the means for visualizing the three-dimensional image is composed of the Fresnel lens array for telecentrically focusing an image and the micro-lens array, the three-dimensional image display apparatus which enables the three-dimensional image to be visualized can be put into practical use.

When the means for visualizing the three-dimensional image is composed of a three-dimensional image visualization screen made of a photo-refractive material, the three-dimensional image display apparatus which enables the three-dimensional image to be visualized can be put into practical use.

When the means for visualizing the three-dimensional image is composed of the optical modulator array where a plurality of optical modulators performing the common amplitude modulation correspond to one pixel and the optical deflector array where an optical deflector corresponds to each of the plurality of optical modulators, in which the images of the plurality of pixels from respective optical modulators are made to coincide by the optical deflector, the three-dimensional image display apparatus which enables the three-dimensional image to be visualized can be put into practical use.

When the one-dimensional optical modulator array is disposed such that information in the horizontal direction of the three-dimensional image is made to enter and the scanning mirror means is disposed so as to scan the three-dimensional section image in the vertical direction of the display screen, a viewer can observe the three-dimensional image in a natural state.

According to the above described three-dimensional image display apparatus of the present invention, since the optical modulator array is composed of the diffraction type array and the optical deflector array is composed of an array having a function of a variable mirror, it is possible to form the three-dimensional section image by shifting an image of a pixel of the diffraction type array in the direction of the optical axis. By scanning this three-dimensional section image with the scanning mirror means, the three-dimensional image can be formed to display the three-dimensional picture image. Further, by providing the means for visualizing the three-dimensional image, the diffusion angle is expanded to be visually recognized as the three-dimensional image.

When the means for visualizing the three-dimensional image is composed of the Fresnel lens for telecentrically focusing an image and the micro-lens array, the visualization of the three-dimensional image is made possible with a simplified structure, so that the three-dimensional image display apparatus can be put into practical use.

When the means for visualizing the three-dimensional image is composed of the Fresnel lens for telecentrically focusing a picture of the three-dimensional image and the scatterer, the visualization of the three-dimensional image is made possible with a more simplified structure, so that the three-dimensional image display apparatus can be put into practical use.

When the means for visualizing the three-dimensional image is composed of a photo-refractive member, the structure of the whole apparatus can be simplified and the visualization of the three-dimensional image is made possible, so that the three-dimensional image display apparatus can be put into practical use.

Further, when the means for visualizing the three-dimensional image is composed of the optical modulator array where the plurality of optical modulators performing the common amplitude modulation correspond to one pixel, and the optical deflector array where an optical deflector corresponds to each of the plurality of optical modulators, the structure of the whole apparatus can be simplified and the visualization of the three-dimensional image is made possible, so that the three-dimensional image display apparatus can be put into practical use.

When the optical modulator array is a one-dimensional array and the one-dimensional optical modulator array is disposed such that information in the horizontal direction of the three-dimensional image is made to enter and the scanning mirror means is disposed so as to scan the three-dimensional section image in the vertical direction of the display screen, the viewer can observe the three-dimensional image in the natural state, because the three-dimensional image is displayed on the display screen in the same state as an actual three-dimensional object.

BRIEF DESCRIPTION OF DRAWINGS

FIGS. 3A and 3B are views to explain the operation of the diffraction type MEMS array;

FIG. 19 is a schematic diagram showing further another embodiment of visualizing a three-dimensional image according to the present embodiment; and FIG. 20 is a schematic diagram showing further another embodiment of visualizing a three-dimensional image according to the present invention.

BEST MODE FOR CARRYING OUT THE INVENTION

Hereunder, embodiments of the present invention will be explained referring to the accompanied drawings.

Figure 1:
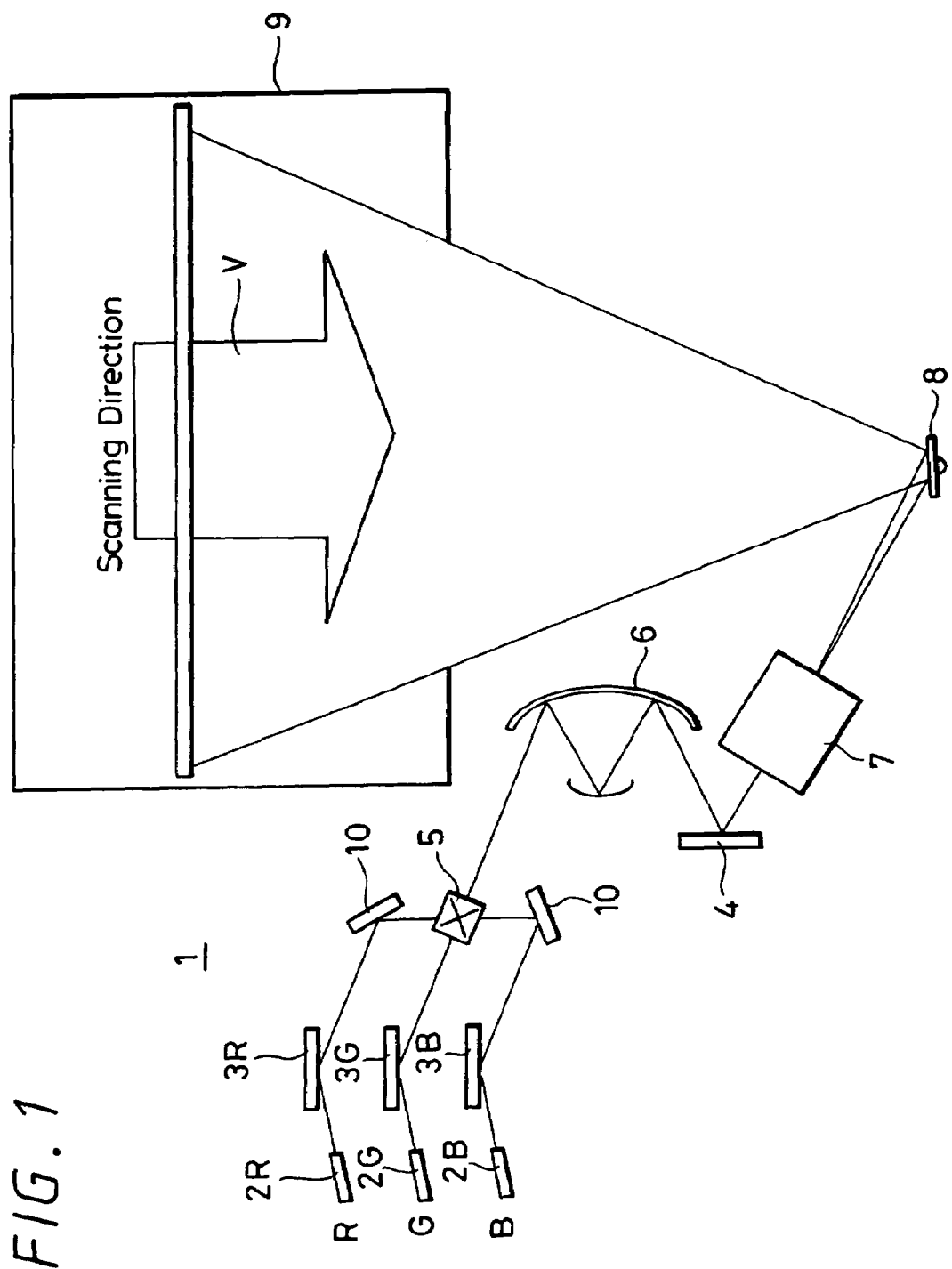
FIG. 1 is a schematic constitutional diagram showing an embodiment of a three-dimensional image display apparatus according to the present invention.

FIG. 1 shows a schematic construction of an embodiment of a three-dimensional image display apparatus according to the present invention.

Since a three-dimensional object has a complex amplitude reflectance, information relating to brightness of the object, that is, an intensity of light, (amplitude) and information relating to a depth (phase) are required when displaying a three-dimensional image. In the embodiments of the present invention, the amplitude and the phase are modulated using a MEMS array.

A three-dimensional image display apparatus 1 according to the embodiment of the present invention includes: laser beam sources 2 [2R, 2G, and 2B] corresponding to three primary colors of red (R), green (G) and blue (B); three sets of one-dimensional optical modulator array 3 [3R, 3G, and 3B] which receive laser beams of respective colors emitted from respective laser beam sources 2R, 2G and 2B to modulate the intensity of the light; a synthesizing means 5 of, for example, a prism for synthesizing on an axis laser beams of respective colors whose intensity are modulated by each of the optical modulator arrays 3; an equi-magnification optical system 6 for focusing an image of the optical modulator 3 by one magnification; one set of one-dimensional optical deflector array 4 to shift an image focusing position of the synthesized laser beam in the direction of a light axis so as to form a three-dimensional section image; a projection lens system 7 to magnify the three-dimensional section image; a scanning mirror means 8 of, for example, a galvanic mirror for scanning the magnified three-dimensional section image so as to generate a three-dimensional image; and a means 9 for visualizing the three-dimensional image, which is a three-dimensional image visualization screen in the case of an example shown in the drawing. A reference numeral 10 denotes a mirror.

The laser beam sources 2 [2R, 2G, and 2B] are light sources which emit coherent laser beams of red, green and blue respectively. In this embodiment, a semiconductor laser having a wavelength of 642 nm is used as a red laser beam source 2R, a solid-state laser having a wavelength of 532 nm is used as a green laser beam source 2G, and a solid-state laser having a wavelength of 457 nm is used as a blue laser beam source 2B. The laser beam from each of the laser beam sources 2R, 2G, and 2B is made into a sheet beam through, for example, a cylindrical lens to enter the one-dimensional optical modulator array 3.

An electrostatic drive type array composed of a diffraction type micro-electro-mechanical system (so-called diffraction type MEMS) is used for each of the three optical modulator arrays 3 [3R, 3G, and 3B] corresponding to respective colors. In this embodiment, the array is composed of a GLV (Grating Light Valve) array. This optical modulator array, that is, the GLV array 3, consists of a plurality of ribbon-shaped mirrors (hereinafter, simply referred to as a ribbon) of, for example, more than six thousand pieces which are arrayed on one line and six pieces of ribbon can be assigned to form one pixel. Among six pieces of ribbon corresponding to one pixel, every other three pieces are movable portions to be a diffraction grating by voltage applied to and perform the amplitude modulation of the light. Therefore, this GLV array 3 is a one-dimensional optical modulator array.

Figure 2A:
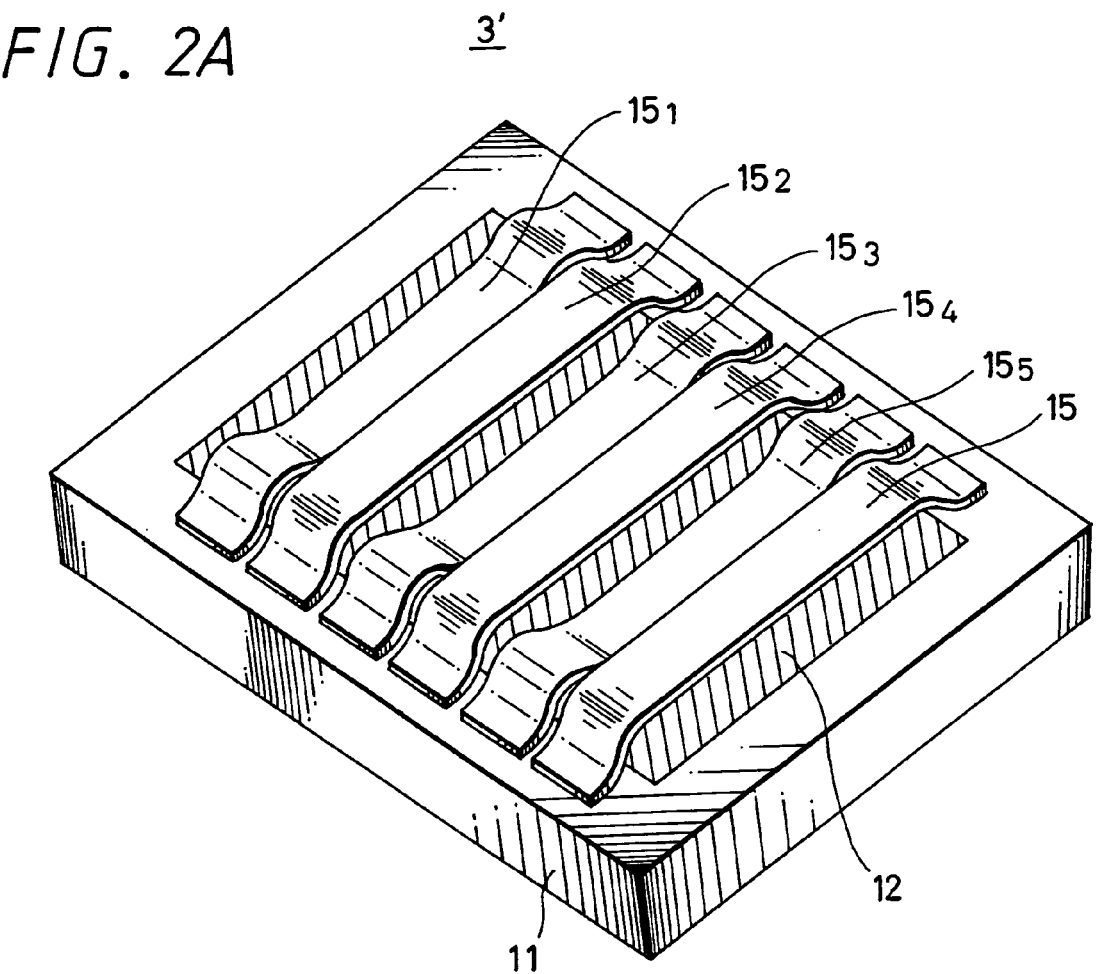
FIG. 2A is a perspective view showing a structure of a diffraction type MEMS array (that is GLV array) that corresponds to one pixel, constituting an optical modulator of the present invention.
Figure 2B:
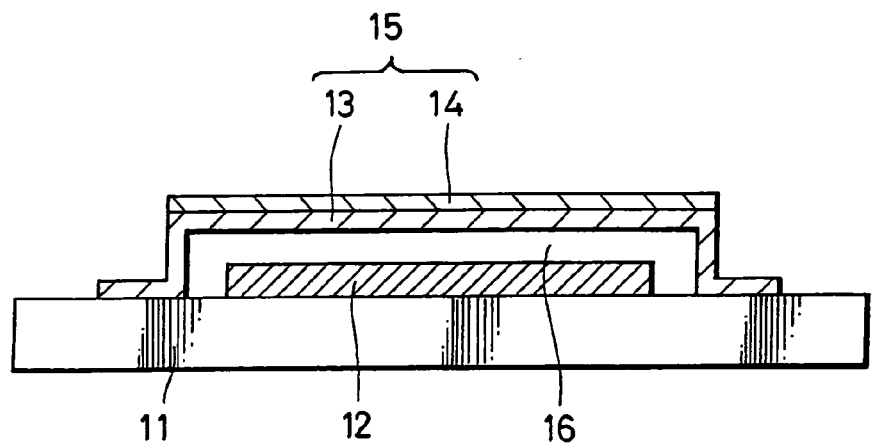
FIG. 2B is a cross-sectional view thereof.

FIGS. 2A and 2B show a schematic structure of one GLV pixel 3' corresponding to one pixel. This one GLV pixel 3' is formed of a common substrate side electrode 12 which is formed on a substrate 11, and six pieces of ribbon 15 [$15_1$, $15_2$, $15_3$, $15_4$, $15_5$, and $15_6$] consisting of an insulating film 13 and a drive side electrode 14 also serving as a reflective film covering the surface thereof, which are formed with support portions to oppose the substrate side electrode 12 with a space 16 in-between. In this GLV pixel 3', the ribbons 15 have a so-called straddled beam structure. The substrate 11 is formed of a silicon substrate having an insulating film thereon, for example. The insulating film 13 constituting the ribbons 15 may be formed with, for example, a silicon nitride film and the drive side electrode 14 may be formed with an aluminum (Al) film, for example. In one GLV pixel 3', three pieces of every other ribbon $15_1$, $15_3$ and $15_5$ are movable ones which come close to and apart from the substrate side electrode 12 by an electrostatic force from an electric signal (that is voltage) applied between the substrate side electrode 12 and the drive side electrode 14, and the other ribbons $15_2$, $15_4$ and $15_6$ are fixed ribbons. FIG. 2A shows a state in which the every other ribbons $15_1$, $15_3$ and $15_5$ are drawn to the substrate side electrode 12. At this time, every other ribbon among the six pieces of ribbon 15 is depressed to form a diffraction grating.

Figure 4:
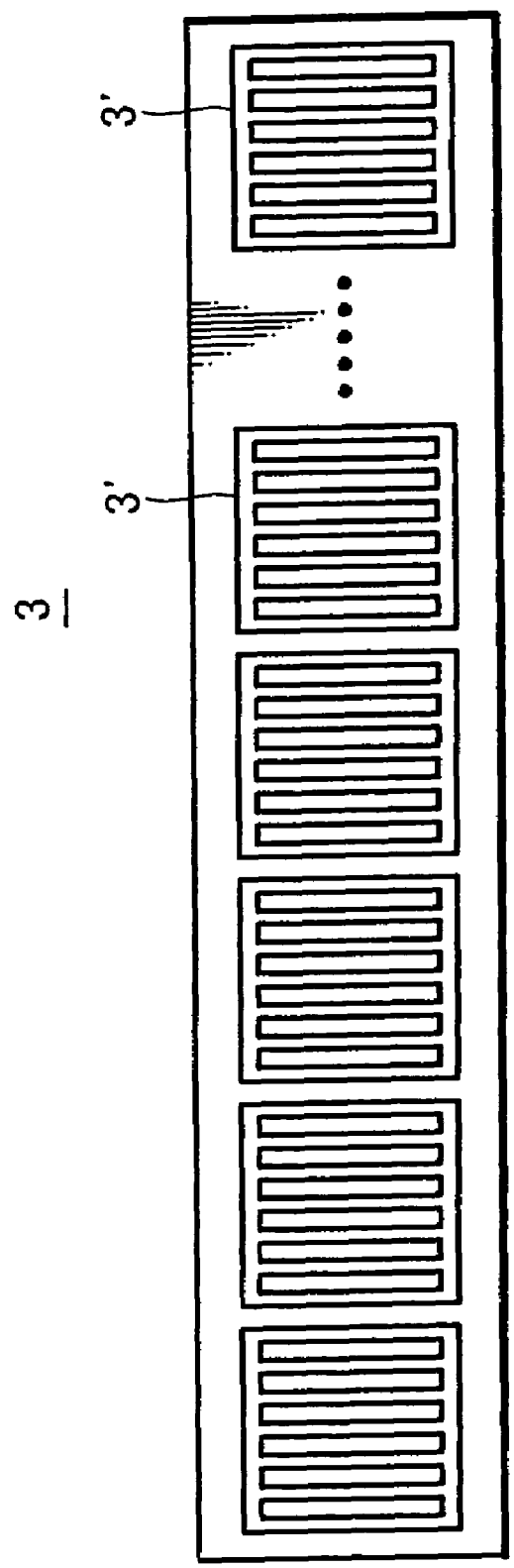
FIG. 4 is a constitutional diagram showing a one-dimensional diffraction type MEMS array according to the present invention.

In the GLV pixel 3', the difference between a phase of laser beams reflected on the surfaces of the movable ribbons $15_1$, $15_3$ and $15_5$ and a phase of laser beams reflected on the surfaces of the fixed ribbons $15_2$, $15_4$ and $15_6$ is analogically controlled. For example, the difference of the phases is controlled analogically in the range of 0 to λ/4. As an alternative, the difference of the phases can be controlled digitally in the range of 0 to λ/4. It is assumed, for example, that a laser beam is vertically incident on this GLV pixel 3'. If six pieces of ribbon 15 form the same plane, the laser beam is reflected straight back vertically as shown in FIG. 3A. At this time, a wave front $W_0$ of the reflected light on the surface of the ribbon 15 is as shown by a dashed line. This reflected light is a zero order light. On the other hand, if every other ribbon among the ribbons 15 is depressed, ±first order light is generated by the diffraction as shown in FIG. 3B in addition to the vertically reflected zero order light. The wave fronts of the ± first order light of $W_1$ and $W_{-1}$ are as shown by a solid line. Although diffraction light of second order and above is also generated, the intensity thereof is small to be negligible. In FIG. 4, a number of such GLV pixels 3' (for example, one thousand pieces) are arranged on the substrate in one direction. In this embodiment, the first one-dimensional GLV array 3 is shown in which such GLV pixels are arranged along the horizontal direction of a three-dimensional image so that information in the horizontal direction of the three-dimensional image can be made to enter accordingly. In this first GLV array 3, a phase of a reflected light of the incident light can be altered individually by each GLV pixel 3'.

Figure 5A:
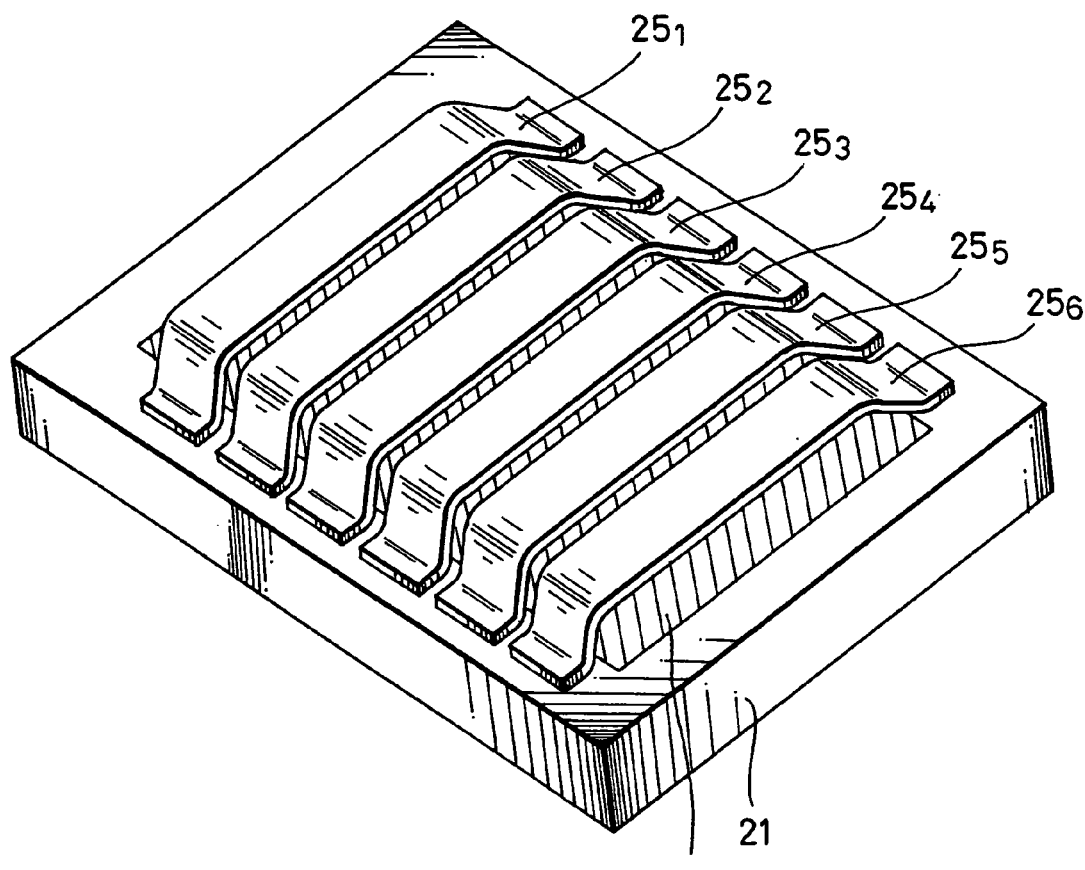
FIG. 5A is a perspective view showing a structure of a MEMS array (that is GLV array) that corresponds to one pixel, constituting an optical deflector array according to the present invention.
Figure 5B:
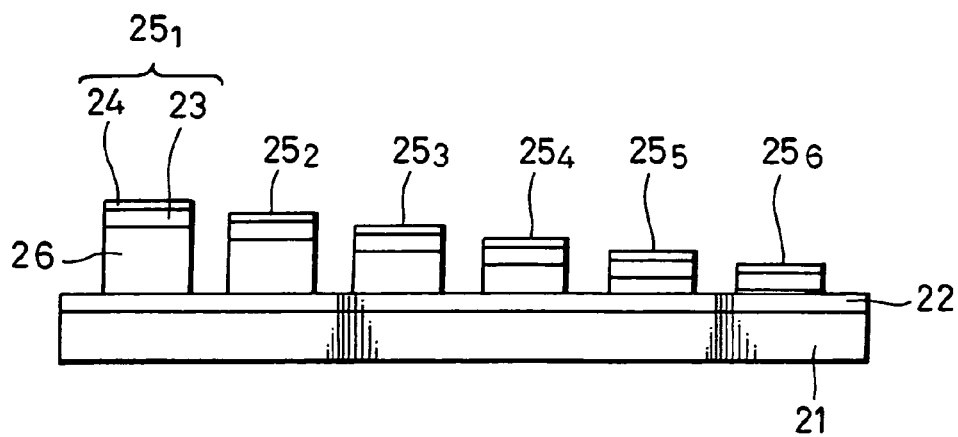
FIG. 5B is a view to explain an operation thereof.

The one-dimensional optical deflector array 4 functions as a reflecting mirror which respectively reflects ±first order diffraction light corresponding to one pixel generated from the optical modulator array 3 to shift an image focusing position of each pixel in the direction of the light axis. The optical deflector array 4 is composed of a second one-dimensional GLV array having a similar structure to the above described optical modulator array 3. FIG. 5 shows one piece of GLV pixel 4' corresponding to one pixel of the second GLV array 4. As shown in FIG. 5A, the GLV pixel 4' is formed similarly to the above described FIG. 2, in which a common substrate side electrode 22 is formed on a substrate 21, and six pieces of ribbon 25 [$25_1$, $25_2$, $25_3$, $25_4$, $25_5$, and $25_6$] consisting of an insulating film of, for example, a silicon nitride film 23 and a drive side electrode of, for example, an aluminum film 24 which also serves as a reflective film covering the surface thereof are formed with support portions to oppose this substrate side electrode 22 with a space 26 in-between. In this GLV pixel 4', the ribbons 25 have a so-called straddled beam structure. Those six pieces of ribbon 25 are driven to form one piece of mirror as a whole. Specifically, respective ribbons $25_1$ to $25_6$ are independently driven by electrostatic force and as shown in FIG. 5B the ribbons from $25_1$ to $25_6$ are displaced to form a shape of stairs by gradually changing a voltage applied between the substrate side electrode 22 and each ribbon 25. Accordingly, those ribbons 25 become equivalent to one piece of mirror tilted with a predetermined angle when viewing as a whole. The tilt angle can be made variable by controlling the electric potential applied to respective ribbons $25_1$ to $25_6$.

Figure 6:
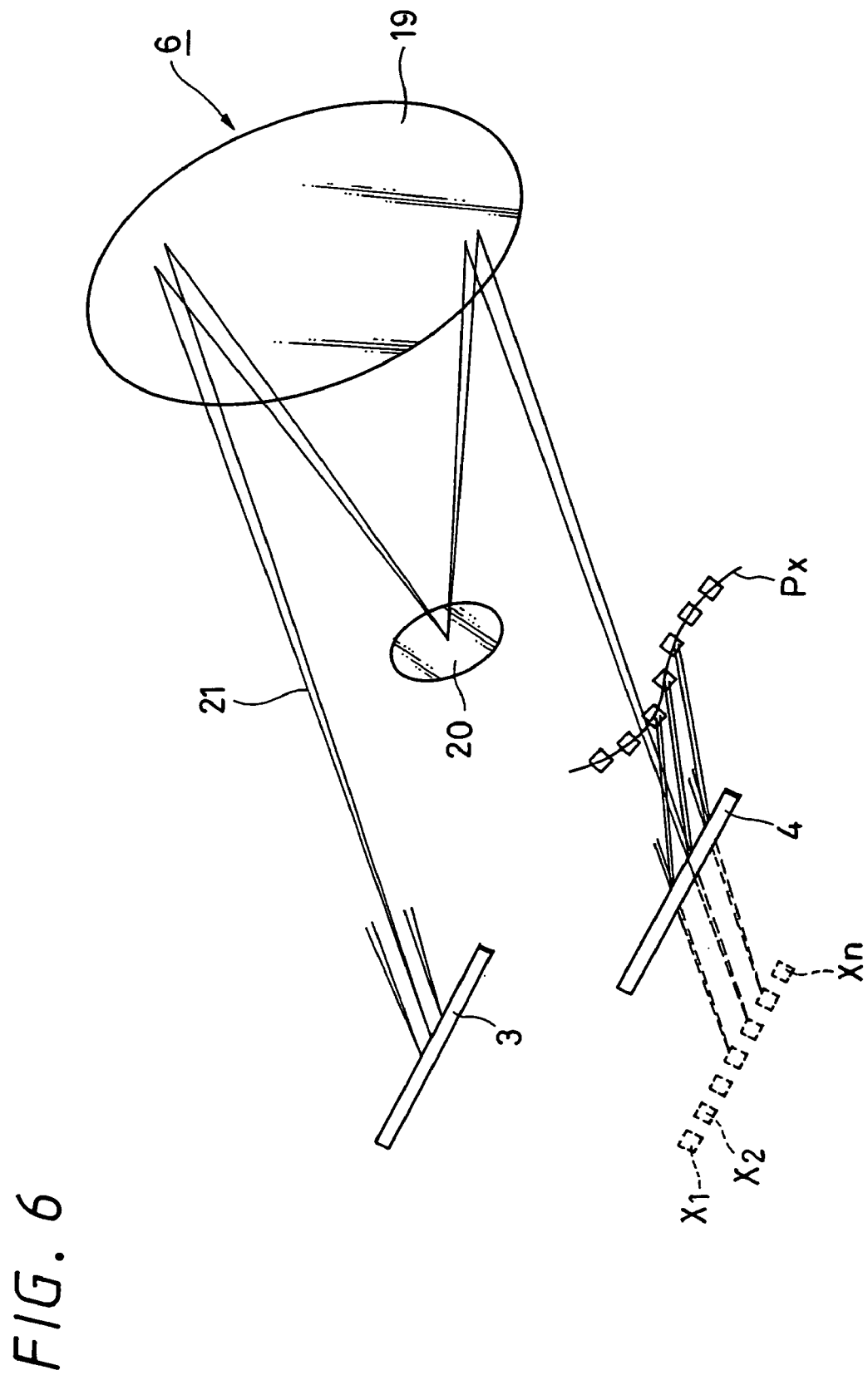
FIG. 6 is a schematic constitutional diagram showing a relevant part of the three-dimensional image display apparatus, from which a three-dimensional section image is obtained, according to the present invention.

In the second GLV array 4 constituting the optical deflector array, two pieces of GLV pixel 4' are provided to correspond to one pixel of the GLV pixel 3' of the first GLV array 3. In other words, two pieces of GLV pixel 4' are provided for ±first order diffraction light emitted from the GLV pixel 3' of one pixel such that a +first order diffraction light beam and a −first order diffraction light beam are deflected respectively. Those two pieces of GLV pixel 4' correspond to two pieces of mirror $53_1$ and $53_2$ or two pieces of mirror $53_2$ and $53_3$ which are shown in later mentioned FIG. 7. This second GLV array 4 is disposed under the first GLV array 3 as shown in FIG. 6. In other words, the first GLV array 3 and the second GLV array 4 are disposed in two stages.

When a laser beam is irradiated on the above described optical modulator array 3, the first GLV array 3 of the one-dimensional optical modulator array can display a part of projected image of a three-dimensional object on a plane. The equi-magnification optical system 6 is for the purpose of generating an intermediate image by one magnification of the image from the first GLV array 3 and is disposed on the light path between the first GLV array 3 and the second GLV array 4.

The equi-magnification optical system 6 is composed of an Offner type two-mirror equi-magnification optical system (hereinafter, referred to as the Offner equi-magnification optical system) consisting of a first concave mirror 19 and a second convex mirror 20 as shown in FIG. 6. A laser beam of an image signal light is irradiated on the first GLV array 3 of the one-dimensional optical modulator array, and is optically modulated to generate ±first order diffraction light 21. The ±first order diffraction light 21 is converged by the Offner equi-magnification optical system 6 to be focused right under the first GLV array 3 as an equi-magnified intermediate image X [$X_1$, $X_2$, ... $X_n$] corresponding to each pixel. At this time, diffraction light components (including the zero order diffraction light) other than ±first order diffraction light components are removed by a Schlieren filter disposed in the Offner equi-magnification optical system 6. The state in which the intermediate image X of equi-magnification is formed right under the first GLV array 3 is the case when the second GLV array 4 of the optical deflector is not provided.

According to the embodiment of the present invention, an optical deflector array functioning as a mirror, that is, the second GLV array 4, is disposed at a position in front of the original position where the intermediate image X from the first GLV 3 array is formed, and by this second GLV array 4 the intermediate image X is made to be focused as a three-dimensional section image $P_x$ in a position different from the original position with altered depth in the direction of the light axis.

Figure 7A:
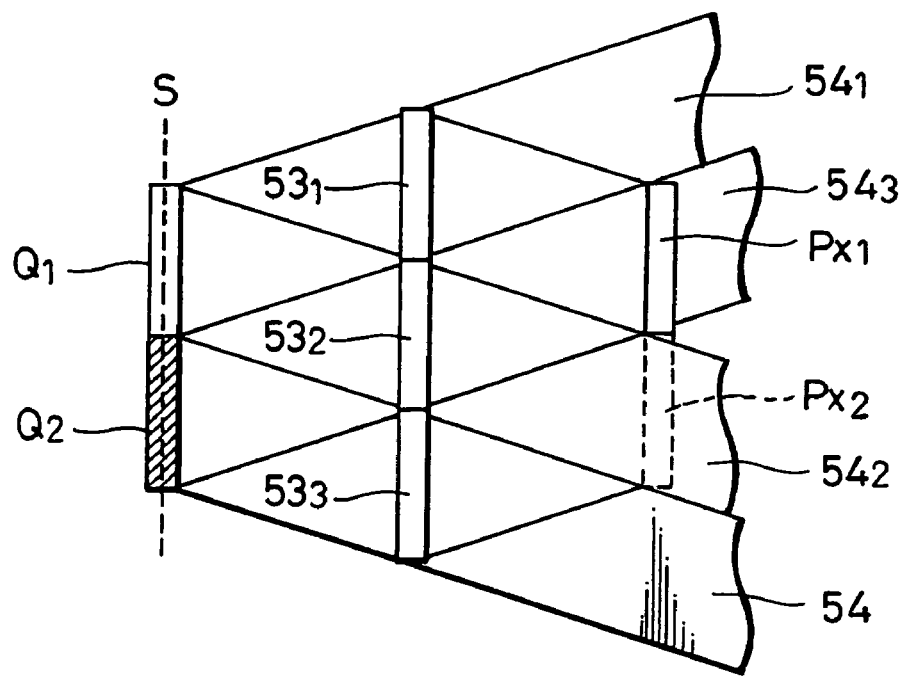
FIGS. 7A and 7B are views provided for explaining operations of the optical deflector array of the present invention.
Figure 7B:
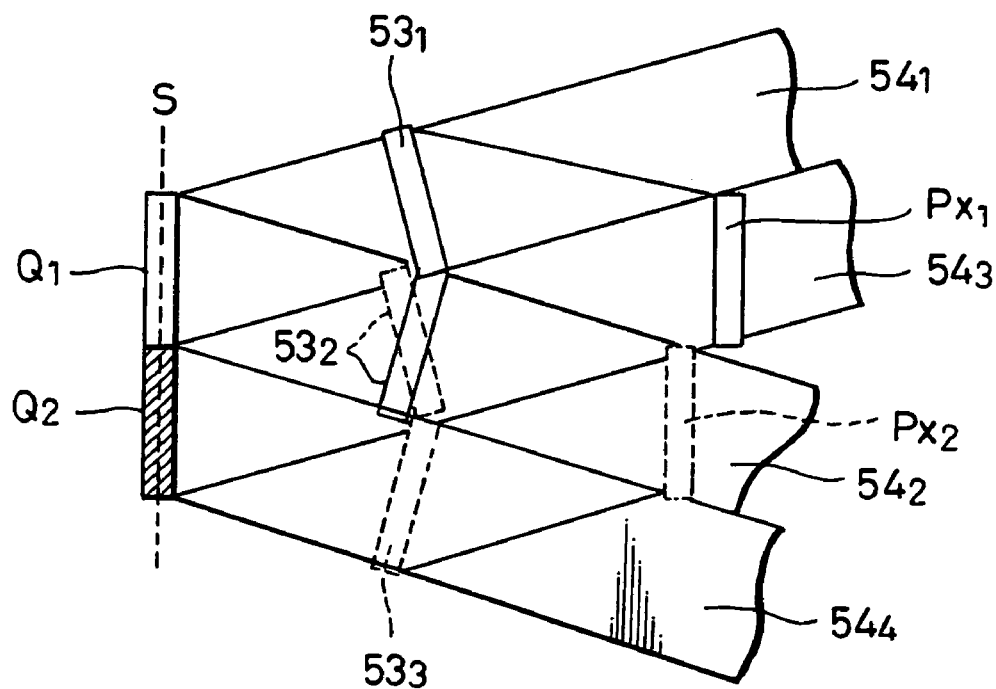

With respect to the GLV pixel 4' of one pixel of the second GLV array 4 constituting this reflex mirror, two pieces thereof are provided corresponding to +first order diffraction light and −first order diffraction light of one pixel. By changing tilt angles of mirror surfaces of those two pieces of GLV pixel 4', reflection angles of ±first order diffraction light are altered, so that the intermediate image of the pixel of the first GLV array 3 which is originally formed on the same plane is shifted in the direction of the optical axis with respect to this plane to generate a three-dimensional section image. An explanation is further made by using FIGS. 7A and 7B showing a principle thereof. In FIGS. 7A and 7B, reference numerals $53_1$, $53_2$, and $53_3$ denote mirrors, and reference numerals $54_1$, $54_2$, $54_3$ and $54_4$ denote light beams. Q1 and Q2 respectively denote intermediate images of equi-magnification of the first pixel and the second pixel in which the image of the first GLV array 3 is focused by the equi-magnification optical system 6. Originally, the intermediate images Q1 and Q2 of equi-magnification of the pixels of the first GLV array 3 are to be formed on the same plane S. In other words, light beams incident on the original position of the intermediate image $Q_1$ of the pixel are parallel light beams (for example, +first order diffraction light) $54_1$ and light beams (for example, −first order diffraction light) $54_2$. Hereupon, the mirrors $53_1$ and $53_2$ are disposed immediately before the light beam $54_1$ and the light beam $54_2$ overlap as shown in the drawing. If the mirror $53_1$ and the mirror $53_2$ are aligned in a straight line without a tilt, the intermediate image $Q_1$ of the first pixel is formed at a position $P_{x1}$ of solid lines by the light beams $54_1$ and $54_2$ which are reflected on the mirrors $53_1$ and $53_2$ as shown in FIG. 7A. Similarly, if the mirrors $53_2$ and $53_3$ are aligned in a straight line without a tilt, the intermediate image $Q_2$ of the second pixel is formed at a position $P_{x2}$ of broken lines by the light beams $54_3$ and $54_4$ which are reflected on the mirrors $53_2$ and $53_3$.

Next, if the mirrors $53_1$ and $53_2$ are rotated respectively in the opposite directions to the equivalent amount around rotational axes passing though respective centers and being perpendicular to the drawing, the intermediate image $P_{x1}$ of the first pixel shifts as shown in FIG. 7B in the right and left direction of the drawing. Herein, the right and left direction on the drawing is a direction of the optical axis when viewing from a projector optical system, that is, from an optical system of the three-dimensional image display apparatus, and the shift is equivalent to shifting the intermediate image of the GLV array 3 in the direction of the optical axis from an object plane. Accordingly, an image focusing point is shifted in the direction of the optical axis and the three-dimensional section image is formed.

Meanwhile, the intermediate image $P_{x2}$ of the second pixel is formed at a position where the light beams (for example, +first order diffraction light) $54_3$ and the light beams (for example, −first order diffraction light) $54_4$ are made incident and converged. This intermediate image $Q_2$ of the second pixel can be generated in the vicinity of the shifted position of the intermediate image $P_{x1}$ of the first pixel by using the mirrors $53_2$ and $53_3$. At this time, since the mirror $53_2$ is used in common, rotation is affected and restricted. Assuming that the amount of shift of the intermediate image of the pixel in the direction of the optical axis alters continuously, a position of the image $P_{x1}$ of the first pixel and a position of the image $P_{x2}$ of the second pixel are gradually shifted in the direction of the optical axis; however, a rotation angle of the mirror $53_2$ required for shifting the image $P_{x1}$ of the first pixel and a rotation angle of the mirror $53_2$ required for shifting the image $P_{x2}$ of the second pixel becomes opposite directions.

Therefore, in order to solve the above problem, time division display such as so-called interlace scanning in a TV receiver may be performed, in which the second pixel is not displayed when the first GLV arrays 3 [3R, 3G, 3B] of the optical modulator arrays display the first pixel.

The purpose of providing the second GLV array 4 as the optical deflector array is to shift the image of the pixel of the first GLV arrays 3 in the direction of the optical axis and to generate a three-dimensional section image with the shifted images of the pixels of the GLV arrays 3 arranged in a row. The three-dimensional image is formed by scanning this three-dimensional section image with one scanning mirror means of, for example, the galvanic mirror 8.

It is preferable that the first GLV array 3 as the optical modulator array is composed such that a plurality of the GLV pixels 3' can be arranged in a one-dimensional array to correspond to the horizontal direction of the three-dimensional image as heretofore described. Specifically, the first GLV array 3 is preferably disposed such that information in the horizontal direction of the three-dimensional image can be made to enter and the image of the pixel of the first GLV array 3 can be irradiated in the horizontal direction on a screen which is a display screen. The galvanic mirror is disposed correspondingly to this first GLV array 3 so that the image of the pixel of the first GLV array 3, that is, the three-dimensional section image can be scanned in a vertical direction of the screen.

The first GLV array 3 and the second GLV array 4 are arranged such that a laser beam can be irradiated obliquely at a predetermined angle.

The three-dimension visualization screen 9 to visualize a three-dimensional image is explained later in detail.

Next, the operation of the three-dimensional image display apparatus 1 shown in FIG. 1 will be schematically explained. Information on the light intensity of image signals is supplied to the first GLV arrays 3 [3R, 3G, and 3B] which are the optical modulator arrays and information on the depth of the image signals is supplied to the second GLV array 4 which is the optical deflector array. Then, laser beams are emitted from the laser beam sources 2R, 2G and 2B corresponding to respective colors of red, green and blue. Each laser beam which becomes an image signal light is made into a sheet beam through, for example, a cylindrical lens not shown, and is made to respectively enter the corresponding first GLV arrays 3R, 3G and 3B of diffraction type optical modulator arrays where the intensity thereof is modulated. The intensity modulated ±first order diffraction light from each of the first GLV arrays 3R, 3G and 3B is made to enter the synthesizing means of, for example, the prism 5 and is synthesized on the optical axis. Specifically, ±first order diffraction light from the central GLV array 3G is made to directly enter the prism 5, and each of ±first order diffraction light from the GLV arrays 3R and 3B on both sides is respectively reflected by the mirror 10 to be made incident on the prism 5. The synthesized laser beam which is synthesized by the prism 5 is made to enter the second GLV array 4 of the optical deflector array through the Offner equi-magnification optical system 6. In this second GLV array 4, ±first order diffraction light beams corresponding to respective pixels are deflected by two pieces of the GLV pixel 4' corresponding to one pixel and a three-dimensional section image of equi-magnification is formed with different image focusing points in the direction of the optical axis respectively. This three-dimensional section image corresponds to a profile line of a front side of a three-dimensional object when a horizontal section of the three-dimensional object is projected on a plane. Subsequently, this three-dimensional section image having a depth is magnified by the projection lens 7 and is scanned in a direction indicated by an arrow V, that is, a vertical direction of a screen by the scanning mirror means of, for example, the galvanic mirror 8 to be irradiated on the three-dimensional image visualization screen 9. On this three-dimensional image visualization screen 9, a three-dimensional image is visualized and displayed. The first GLV array 3 and the second GLV array 4 are driven in synchronization with each other.

Next, a specific example is explained in detail, in which an image focusing position of a pixel is shifted in the direction of the optical axis by the optical deflector array 4 to form a three-dimensional section image.

Hereupon, a pixel size of the first GLV array 3 as the optical modulator, that is, the size of one GLV pixel 3' equivalent to one pixel, is assumed to be a square of 25 µm. There are six pieces of ribbon 25 in one GLV pixel 3' and a period P of the ribbon 25 becomes P=25/3=8.3 µm.

Assuming that P sin $\theta=\lambda=0.55$ µm, a diffraction angle $\theta$ with respect to ±first order diffraction light, which is determined by this equation, becomes $\theta=3.78°$.

On the other hand, a size of one GLV pixel (hereinafter, referred to as a mirror for convenience) 4' in the second GLV array 4 (equivalent to a mirror) which functions as the optical deflector array is also assumed to be a square of 25 µm which is equal to the size of one pixel of the first GLV array 3. The position of the second GLV array 4 is arranged at 189 µm from the intermediate image of the first GLV array 3 based on the size of this mirror 4' and the diffraction angle $\theta$. If the mirror 4' is not rotated, a shifted position of the intermediate image of equi-magnification is 189 µm from the mirror 4'. When the mirror 4' is rotated (that is, tilted), a tilt angle of marginal light beams, that is, an angle made by ±first order diffraction light beams reflected on the second GLV array 4, becomes 78°−2$\theta$, and when the intermediate image is shifted parallel in the direction of the optical axis, a position of the shifted intermediate image is the position distant from the surface of the mirror 4' to the amount of $$12.5/\tan(3.78-2\theta).$$

Accordingly, the position of the shifted image becomes infinity at $\theta=1.89°$.

Figure 8:
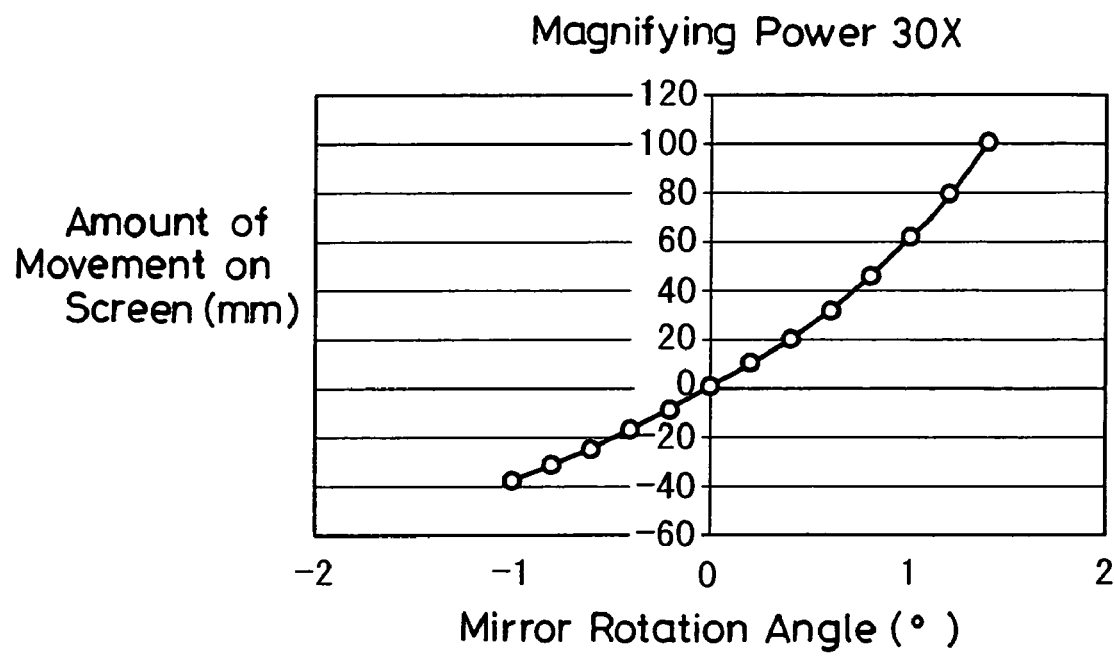
FIG. 8 is a graph showing a relation between a mirror rotation angle and the amount of shift of an image in the direction of depth on a screen, which is used for explaining the present invention.
Figure 9:
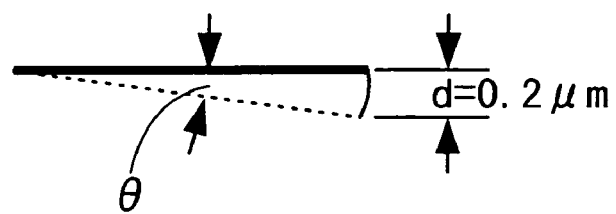
FIG. 9 is an explanatory view showing a tilt angle and the amount of depression of a ribbon of a GLV pixel which functions as a mirror.

FIG. 8 is a graph showing a relation between the rotation angle (tilt angle) $\theta$ of the mirror 4' and the amount of displacement of the image position on a screen. This is the case in which the image is projected in thirty-fold magnification on the screen. If the range of the rotation angle of the mirror 4' is within ±1°, the depth of ±50 mm can be realized as is obvious in FIG. 8. In this connection, when the mirror 4' of 25 μm square inclines by 1°, the amount of depression d is 0.2 μm as shown in FIG. 9. Further, a minute rotational movement of the mirror 4' described herein should be made in synchronization with driving of the first GLV array 3 which functions as the optical modulator array. Accordingly, the optical deflector array 4 is required to operate in the same micro seconds as the optical modulator 3, and a GLV device is suitable as a MEMS device capable of operating in micro seconds. In this embodiment, since the optical deflector array 4 functioning as the mirror is composed of the same MEMS array, that is, a GLV array as the optical modulator array 3, the optical deflector 4 can be easily driven in synchronization with the optical modulator 3, so that a high speed operation becomes possible in micro seconds.

Figure 10:
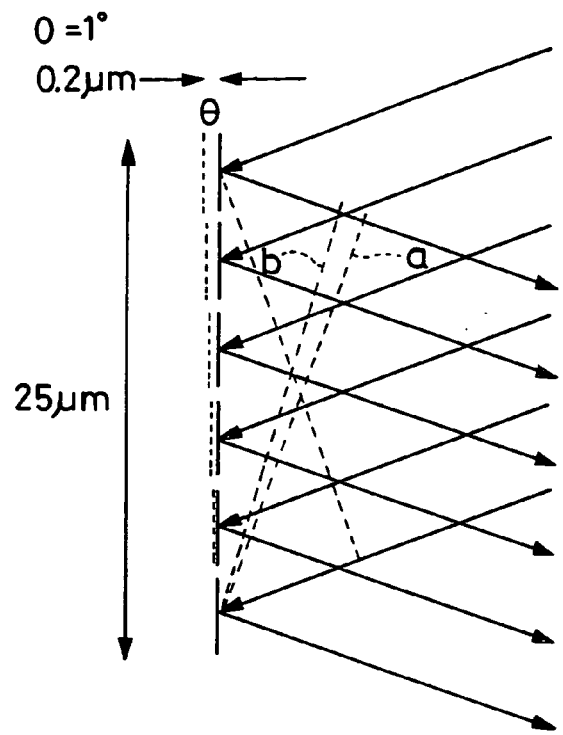
FIG. 10 is an explanatory view showing a tilt of a reflected wave front of diffraction light due to a tilt of a mirror surface of the GVL pixel.

As heretofore described, when a voltage applied to six pieces of ribbon $25_1$ to $25_6$ of the GLV pixel 4' is altered in stages, the six pieces of ribbon 25 become equivalent to being rotated as a whole and can tilt the diffraction light. When the rotation angle of the whole ribbons 25 is 1°, a maximum displacement of the whole ribbons 25 is 0.2 μm and therefore, the maximum displacement of the ribbons 25 of the GLV pixel 4' does not have much difference from $\lambda/4=0.13$ μm. FIG. 10 shows a tilt of a wave front of a light reflected on a mirror surface, when the mirror surface of one GLV pixel 4' is tilted. Reference marks a and b show the wave fronts tilted according to the tilt angle of the mirror surface.

Figure 11:
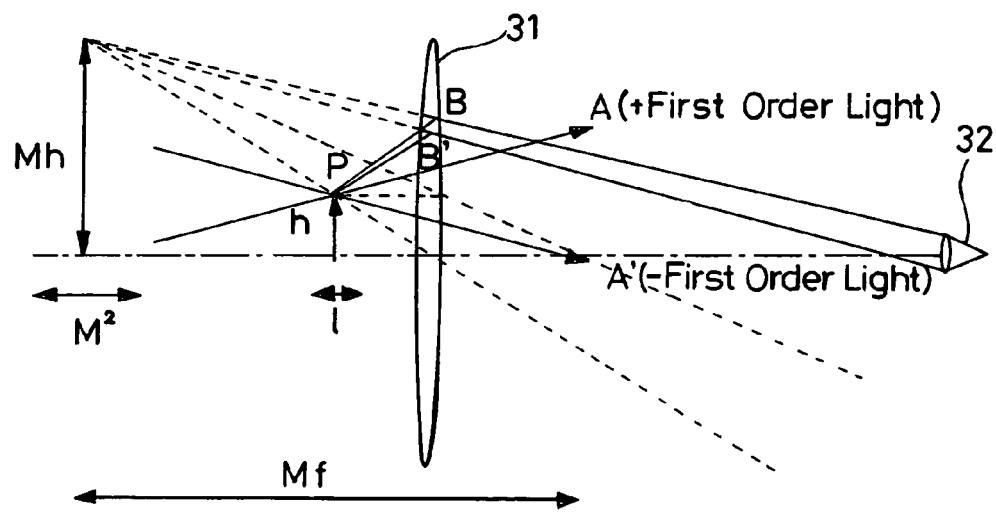
FIG. 11 is an explanatory view of a diffusion angle of a three-dimensional section image.

A longitudinal length of a three-dimensional section image formed by the above described two stages of the first and second GLV arrays 3 and 4 is determined by the size of a GLV pixel. The size is typically somewhere around 27 mm. It has already been explained that the depth of the three-dimensional section image can be made infinity. However, a diffusion angle of this three-dimensional section image is limited. The fact will be explained using FIG. 11 in which a virtual image of the three-dimensional section is observed through a lens.

An attention is focused on a point P on a three-dimensional section image. The point P represents the above described image of the pixel obtained from the first and second GLV arrays 3 and 4. Since the image of the pixel of the first GLV array 3 is mainly formed with its ±first order diffraction light, there are only two spatial frequency components therein even though a proceeding direction of the diffraction wave is altered by the second GLV array 4. Those components are indicated by light beams A and A' (corresponding to +first order diffraction light and −first order diffraction light). When observing a M-times magnified virtual image (height Mh) of the image of the point P (height h) through a lens 31, light beams which an eye 32 needs are those within the range of B to B', and the light beams A and A' do not contribute to the vision of virtual image at all. Therefore, depending on positional arrangement of the image of the point P from the second GLV array 4, the lens 31 and the eye 32, it is concluded that generally light beams emitted from the point P having a wide range of angle are required for the vision of a virtual image. This range of angle is called as a diffusion angle required for viewing the virtual image. The diffusion angle required for a three-dimensional vision is said to be 60° at minimum.

Next, the three-dimensional image visualization screen 9 is explained, in which a three-dimensional image is visualized, that is, the diffusion angle is expanded. FIGS. 12 to 15 show an embodiment of the three-dimensional image visualization screen 9. The same reference numerals are given to parts corresponding to those in FIG. 1.

Figure 12:
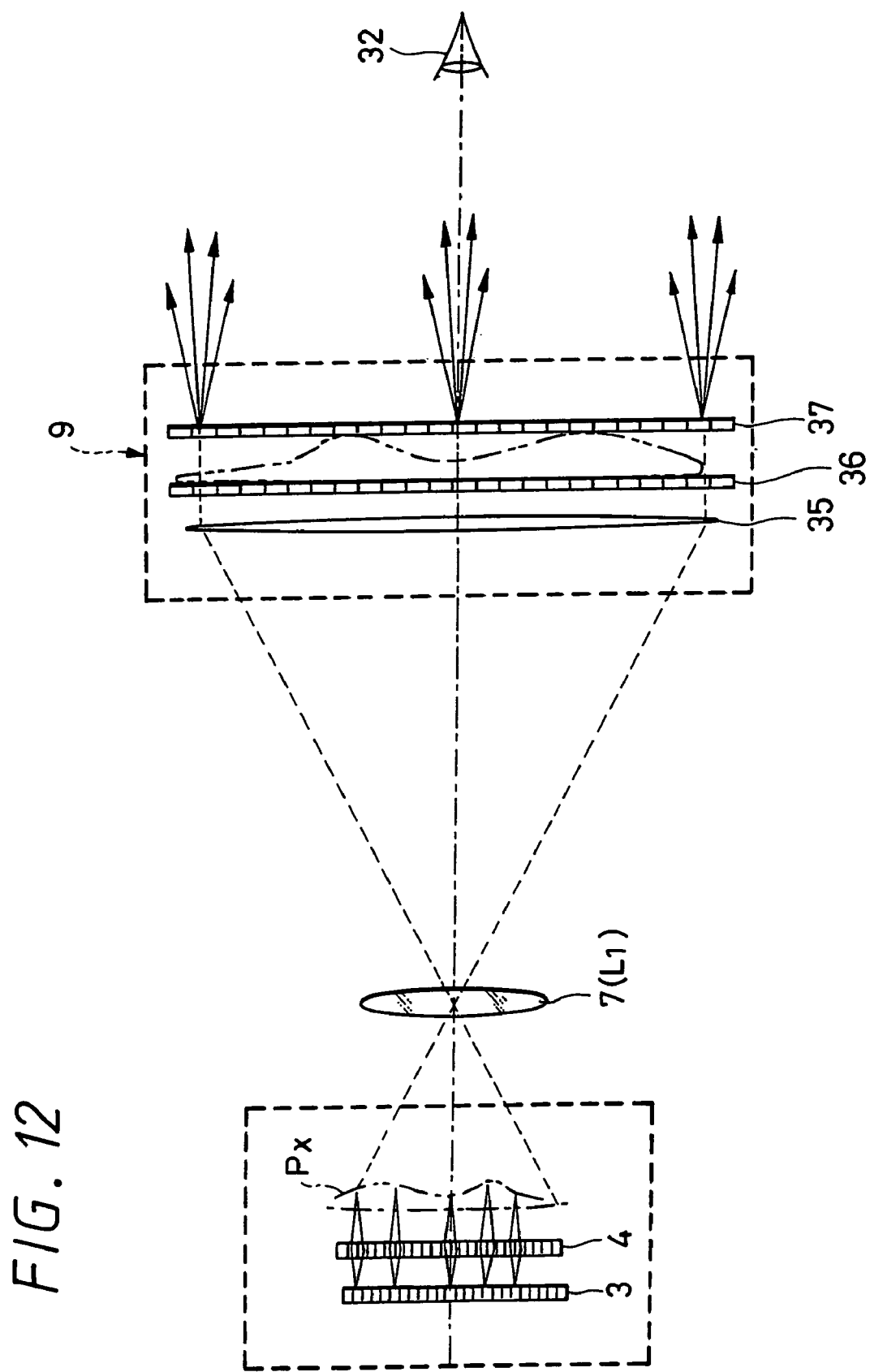
FIG. 12 is a schematic constitutional diagram showing an embodiment of visualizing the three-dimensional image according to the present invention.
Figure 13:
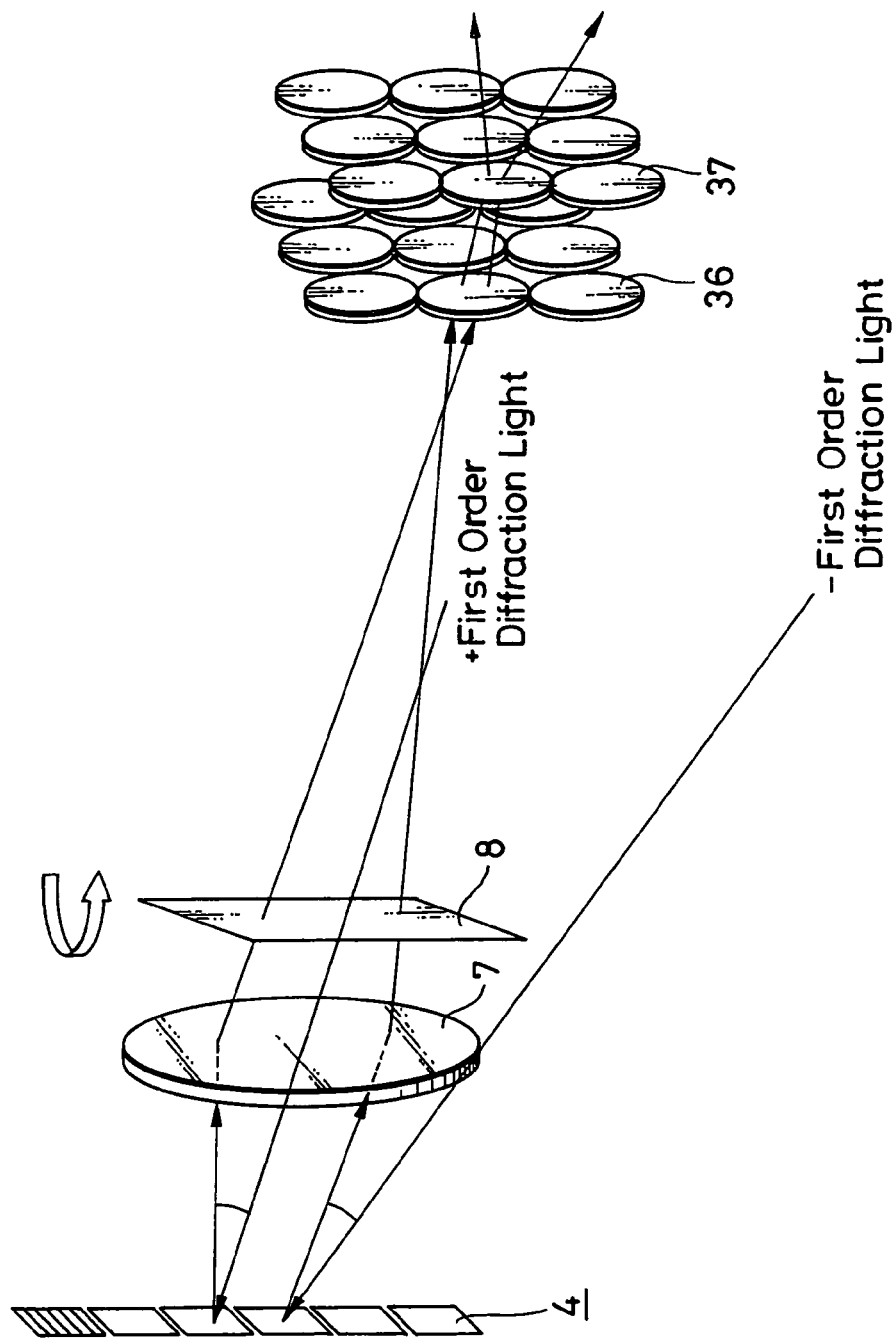
FIG. 13 is a schematic diagram showing an embodiment of visualizing the three-dimensional image according to the present invention.
Figure 14:
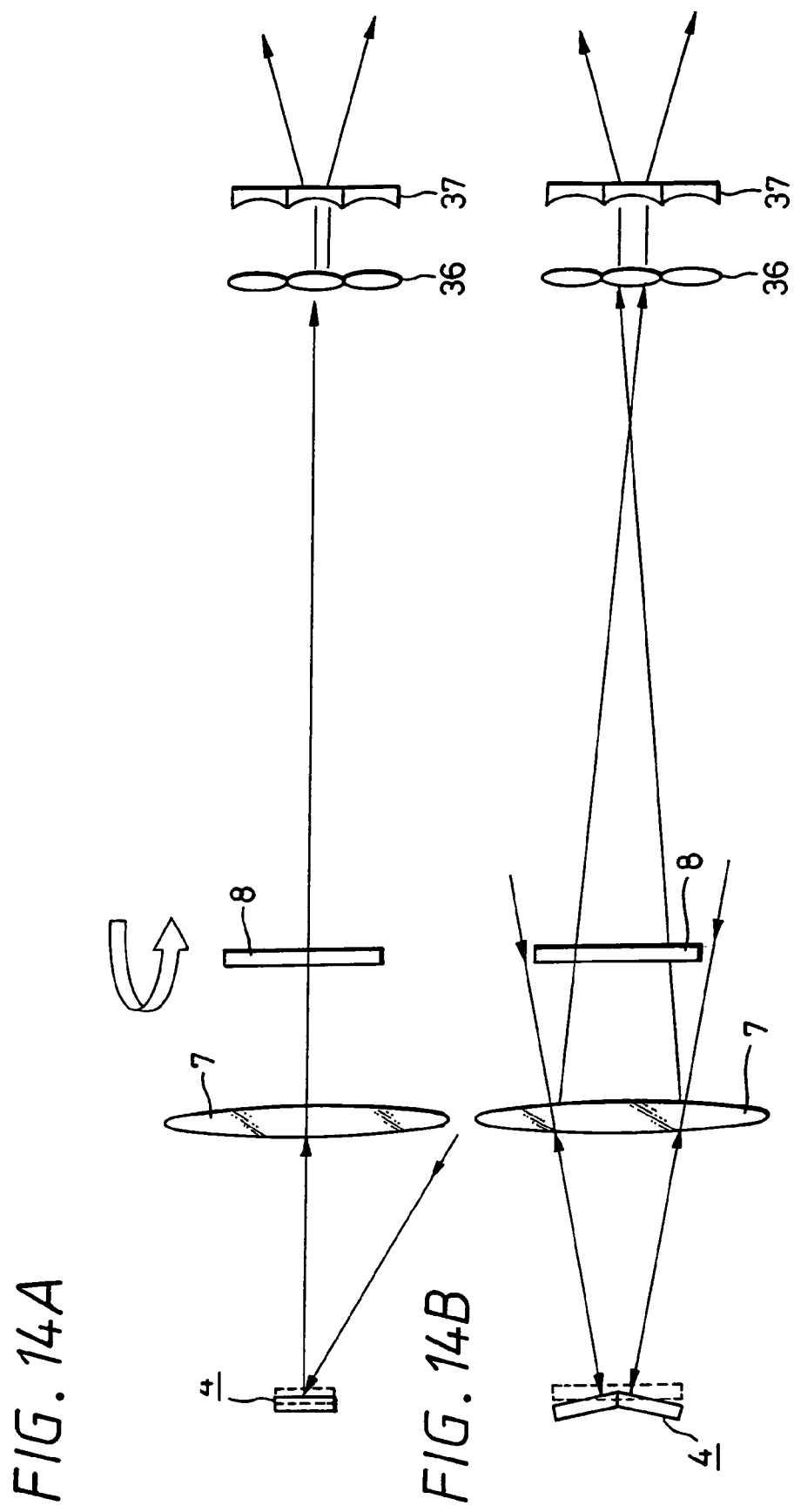
FIG. 14A is a plan view looking FIG. 13 from right above.
FIG. 14B is a side view looking FIG. 13 from right beside.

A three-dimensional image visualization screen $9_1$ according to this embodiment includes: a Fresnel lens 35 for telecentrically focusing a picture of a three-dimensional image and two pieces of micro-lens array disposed at a predetermined interval, which are a positive micro-lens array (convex lens) 36 having a focal length $f_3$ and a negative micro-lens array (concave lens) 37 having a focal length $-f_4$ in this embodiment, as schematically shown in FIGS. 12 to 14. Hereupon, it is assumed to be $f_3 > f_4$. In other words, according to this embodiment, the Fresnel lens 35 is disposed in front of a mean image plane of a magnified-image projection system to compose a tele-centric system in which a main light beam becomes parallel to the optical axis.

Figure 15:
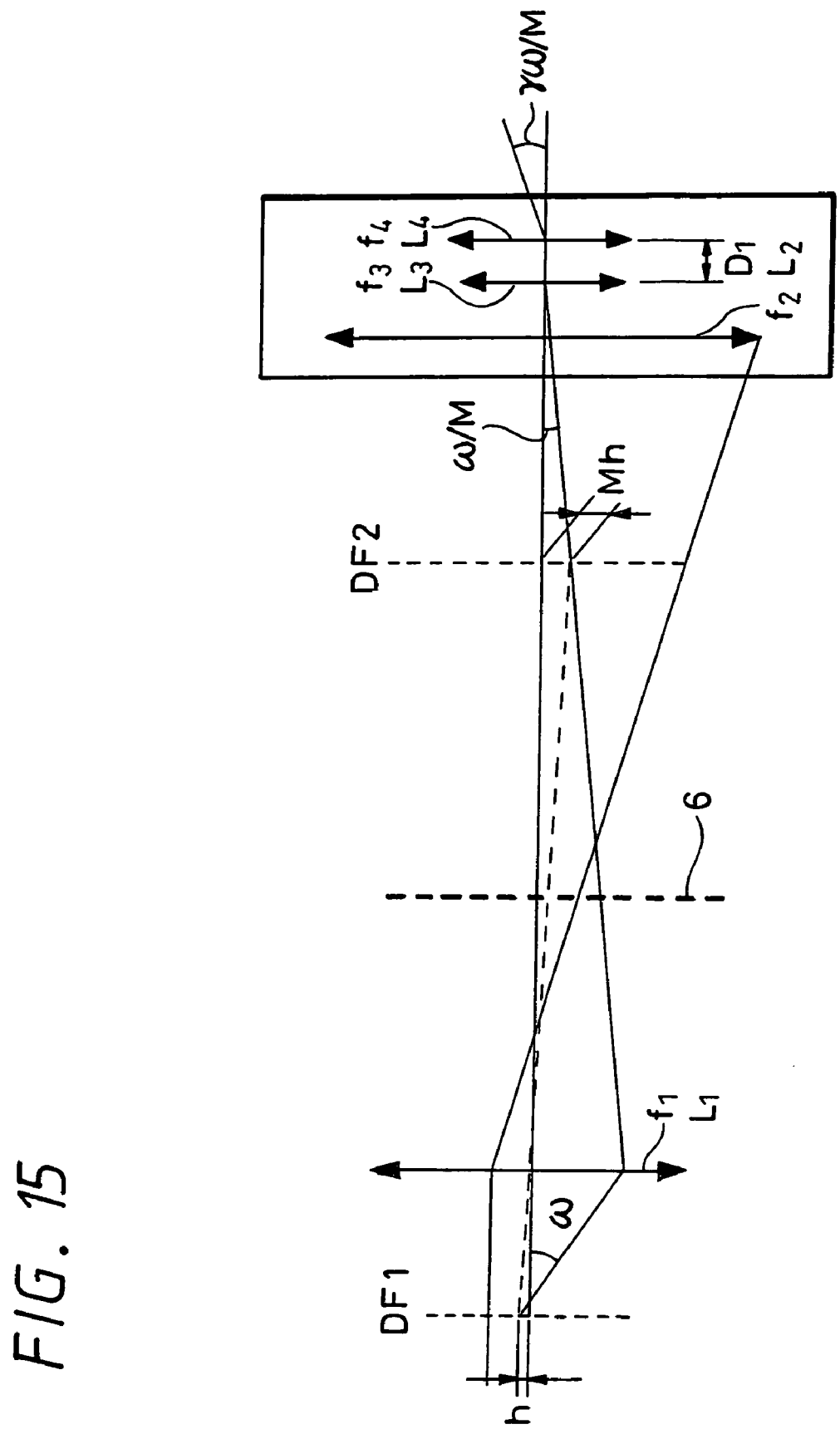
FIG. 15 is an explanatory view of an embodiment of visualizing the three-dimensional image according to the present invention.

Amplitude modulation is performed on a sheet beam of a laser beam by the first GLV array 3 and an image focusing position of a pixel is shifted in the direction of the optical axis by the second GLV array 4 to form a three-dimensional section image. When this three-dimensional section image $P_x$ is magnified to be projected by a projection lens 7 having a magnifying capacity M, the depth of the three-dimensional image $P_x$ is magnified and projected by $M^2$ times. At this time, a diffusion angle ω of each pixel is reduced to 1/M (refer to FIG. 15). Focusing an attention on one pixel on an axis, this structure is explained in detail by using FIG. 15. In FIG. 15, DF1 denotes an image generated by an optical deflector (corresponding to the GLV pixel 4'), DF2 denotes an image generated by a projection lens $L_1$ (equivalent to numeral 7 in FIG. 12), $f_1$ denotes a focal length of the projection lens $L_1$ and M denotes its lateral magnification. Assuming that a height of a light beam in the image DF1 of the optical deflector is h, the height of a light beam in the image DF2 of the optical deflector DF1 becomes Mh. Also, $L_2$ denotes a Fresnel lens (equivalent to numeral 35 in FIG. 12). A positive micro-lens array $L_3$ having a focal length $f_3$ (equivalent to numeral 36 in FIG. 12) is disposed behind a mean image plane in the same pitch as the image DF2 of a pixel which is magnified by M times and a negative micro-lens array $L_4$ having a focal length $-f_4$ (equivalent to numeral 37 in FIG. 12) is disposed in front of the mean image plane, in which it is assumed to be $f_3 > f_4$. When an interval $D_1$ between the positive micro-leans array $L_3$ and the negative micro-lens array $L_4$ is made to be $f_3 - f_4$ and optical axes of the positive micro-lens array $L_3$ and the negative micro-lens array $L_4$ are made to coincide to function as an a focal micro-lens system as a whole, an angle magnifying capacity γ of this a focal micro-lens system becomes $\gamma = f_3/f_4 > 1$ and a tilt angle of a light beam passing through the a focal micro-lens system is magnified by γ times to expand a projection angle. This a focal micro-lens system functions like a telescopic lens. Accordingly, a visualization of a three-dimensional image becomes possible. As a result, it is possible to realize a large screen and an expansion of diffusion angle at the sacrifice of depth while maintaining a resolution. As mentioned above, since the depth of a three-dimensional section image can be made infinity by a GLV array of a diffraction type, the sacrifice of the depth does not matter when practically used.

Figure 16:
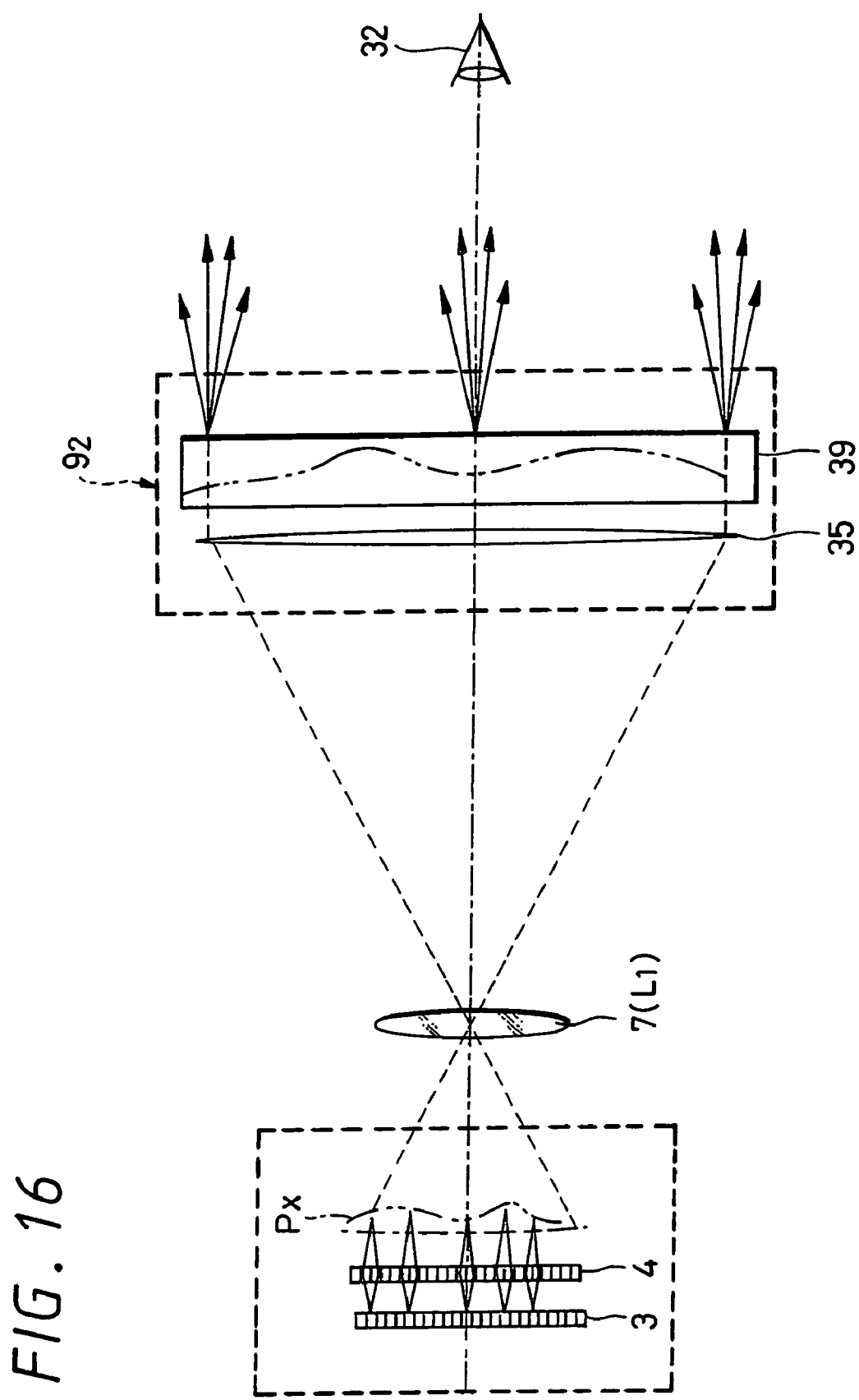
FIG. 16 is a schematic constitutional diagram showing another embodiment of visualizing a three-dimensional image according to the present invention.
Figure 17:
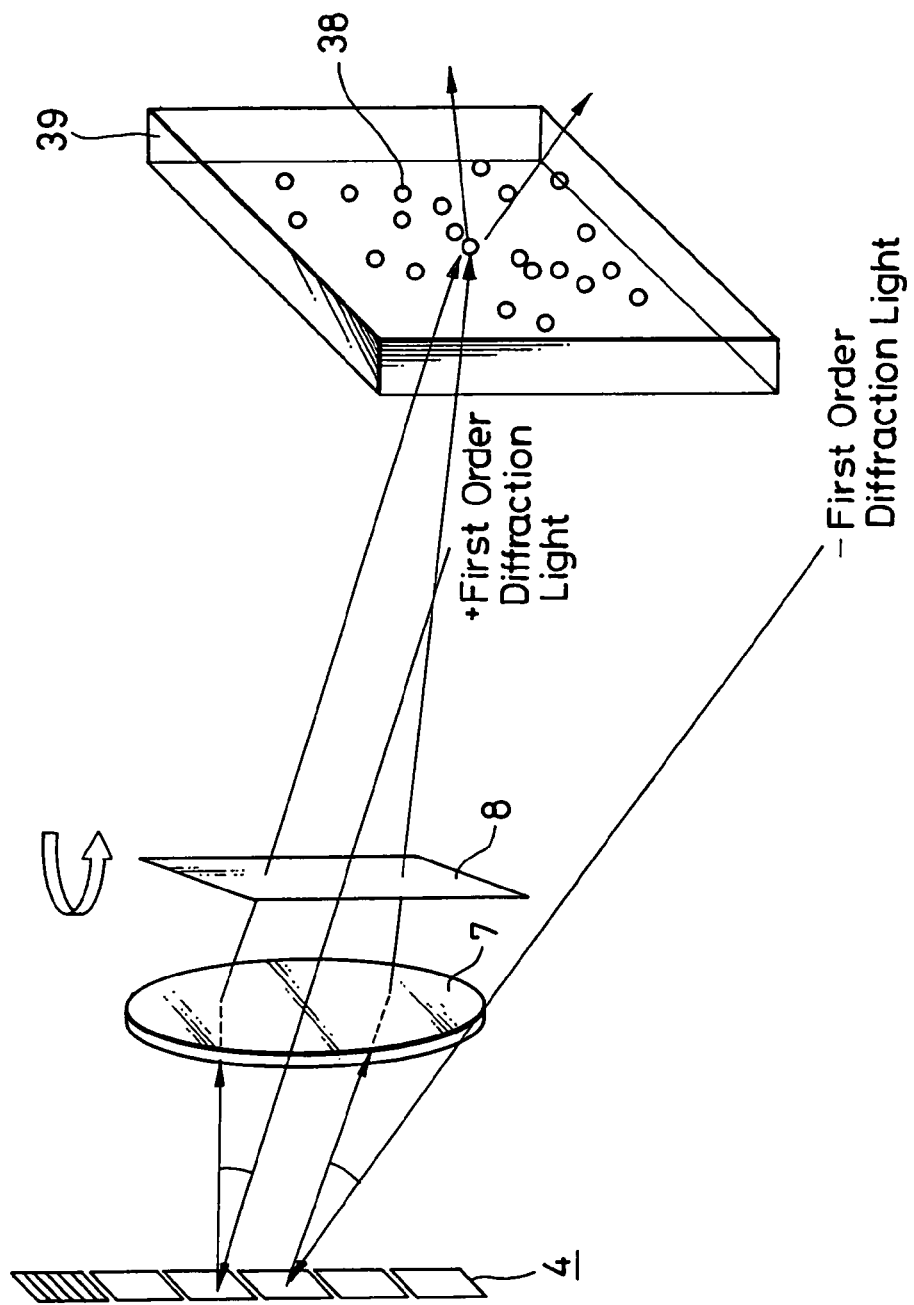
FIG. 17 is a schematic diagram showing another embodiment of visualizing the three-dimensional image according to the present invention.
Figure 18:
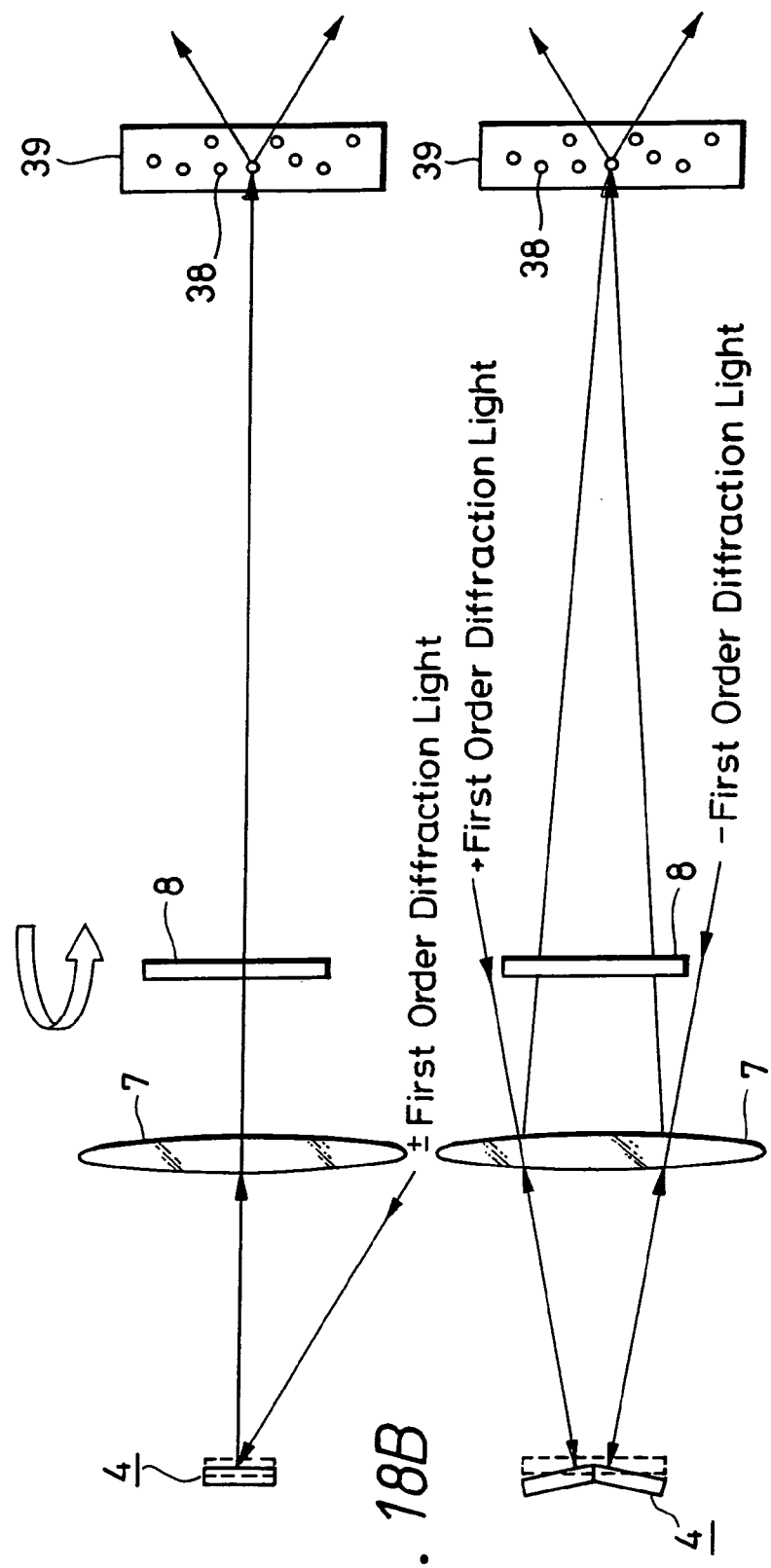
FIG. 18A is a plan view looking FIG. 17 from right above.
FIG. 18B is a side view looking FIG. 17 from right beside.

FIGS. 16 to 18 show another embodiment of the three-dimensional image visualization screen 9. Here, the same reference numerals are given to parts corresponding to those in FIG. 1.

As schematically shown in FIGS. 16 to 18, a three-dimensional image visualization screen $9_2$ according to this embodiment includes a Fresnel lens 35 for telecentrically focusing a picture of a three-dimensional image and a scatterer 39 in which minute scattering particles 38 are uniformly dispersed. The other structure is similar to that shown in FIGS. 12 to 14. A magnified three-dimensional image is irradiated on this scatterer 39 to realize an expansion of a diffusion angle through diffusion of the scattering particles corresponding to an image focusing point, thereby enabling the visualization of the three-dimensional image.

FIG. 19 shows another embodiment of a means for visualizing a three-dimensional image.

A light beam having a wide range of angle to emit an image of the second GLV array 4 is required for visualizing the virtual image. In this embodiment, a three-dimensional image visualization screen $9_3$ is composed of a photo-refractive material 41. For example, a material of iron-doped niobium acid lithium and the like can be used as the photo-refractive material 41. The three-dimensional image visualization screen $9_3$ made of the photo-refractive material 41 is disposed at a position where ±first order diffraction light from the first GLV array 3 is focused by the mirror surface of the second GLV array 4. The photo-refractive material 41 needs to be a material which responds instantly so as to generate a periodic refractive index change and disappears immediately. In this embodiment, the image of the first GLV array 3 is formed in this photo-refractive material through the mirror of the second GLV array 4 as an interference pattern 46 of ±first order diffraction wave 44 and −first order diffraction wave 45. An electron and an electron hole are generated in a bright part of the interference pattern 46 which is formed only at a portion where ±first order diffraction waves are intersected. Among them, electrons move toward a dark part of the interference pattern 46 by an internal electric field based on a spontaneous polarization in a ferroelectric crystal and generate the periodic refractive index change locally in the crystal. This phenomenon is called a photo-refractive effect. If the interference pattern 46 made of ±first order diffraction waves 44 and 45 moves within the crystal during a process in which the electron moves, the periodic refractive index change does not occur and there occurs a phenomenon in which an incoherent dispersion of light is reinforced at a position where the interference pattern is formed. The diffusion angle of the three-dimensional image is expanded with this dispersion light.

FIG. 20 shows another embodiment of a means for visualizing a three-dimensional image.

The second GLV array 4 described above was to shift an image of a pixel in the direction of the optical axis by using two pieces of the GLV pixel 4' corresponding to ±first order diffraction light with respect to one pixel. According to this embodiment, one pixel consists of a plurality of, for example, three pieces of GLV pixel 3' [$3_1$', $3_2$' and $3_3$'] in the first GLV array 3 functioning as the optical modulator array, and amplitude modulation is performed on those three pieces of GLV pixel 3' [$3_1$', $3_2$' and $3_3$'] in common. In the second GLV array (optical deflector array) 4, two pieces of the GLV pixel (optical deflector) 4' [$4_1$' and $4_2$'] are made to correspond to each of the GLV pixels (optical modulator) $3_1$', $3_2$' and $3_3$'. Deflection angles of two pieces of the GLV pixels (optical deflector) $4_1$' and $4_2$' are to be controlled so that the two pieces of the GLV pixel $4_1$' and $4_2$' corresponding to each of the GLV pixels 3' [$3_1$', $3_2$' and $3_3$'] not only shift ±first order diffraction light in the direction of the optical axis to the equal amount but also shift the light in the direction perpendicular to the optical axis. At this time, intermediate images of the three pieces of GLV pixel 3' [$3_1$', $3_2$' and $3_3$'] are made to coincide. Accordingly, three sets of ±first order diffraction light beams overlap on one image point P to cause a state as if an image containing high order diffraction light were formed and the diffusion angle of the image point P can be expanded.

When the above means for visualizing the three-dimensional image having such structure is provided, a transparent screen may be disposed or it is possible to make a screen unnecessary.

According to the above described embodiments of a three-dimensional image display apparatus of the present invention, an image signal of moving image data is supplied to the first GLV arrays 3 [3R, 3G, and 3B] which are the optical modulator arrays and the second GLV array 4 which is the optical deflector array, so that a three-dimensional moving image can be displayed.

Further, according to the embodiments of the three-dimensional image display apparatus of the present invention, an image signal of still image data is supplied to the first GLV arrays 3 [3R, 3G, and 3B] which are the optical modulator arrays and the second GLV array 4 which is the optical deflector array, so that a three-dimensional still image can be displayed.

Further, according to the embodiments of the three-dimensional image display apparatus of the present invention, image signals containing moving image data and still image data are supplied to the first GLV arrays 3 [3R, 3G, and 3B] which are the optical modulator arrays and the second GLV array 4 which is the optical deflector array, so that three-dimensional images of a moving image and a still image can be continuously displayed in chronological order.

According to the three-dimensional image display apparatus of the above described embodiments, since the optical modulator array is composed of the first GLV arrays 3 which is a diffraction type MEMS and the optical deflector array is composed of the second GLV array 4 functioning as a variable mirror, an image of a pixel of the first GLV array 3 is shifted in the direction of the light axis to form a three-dimensional section image. By scanning this three-dimensional section image using a scanning mirror means of, for example, a galvanic mirror, a three-dimensional image can be formed and three-dimensional images of a moving image, a still image and the like can be displayed.

Further, since a means for visualizing a three-dimensional image is provided, a diffusion angle can be expanded to visually recognize a three-dimensional image. By using the three-dimensional image visualization screen $9_1$ as the means for visualizing the three-dimensional image, which consists of the Fresnel lens 35 for telecentrically focusing an image and the a focal lens system composed of both microlens arrays 36 and 37, visualization of a three-dimensional image is made possible with a simplified structure, so that a three-dimensional image display apparatus can be put into practical use.

Since the optical deflector array 4, which is made to function as a mirror, is formed of the second GLV array, the optical deflector array 4 can be driven in synchronization with the driving of the first GLV array 3 which is the optical modulator and a minute rotational movement of the mirror can be operated in micro seconds. Accordingly, particularly a high speed and high performance three-dimensional moving image display apparatus can be provided.

By using the three-dimensional image visualization screen $9_2$ as the means for visualizing the three-dimensional image, which consists of the Fresnel lens 35 for telecentrically focusing a picture of a three-dimensional image and the scatterer 39 in which the minute scattering particles 38 are uniformly dispersed, visualization of the three-dimensional image is made possible with a further simplified structure, so that the three-dimensional image display apparatus can be put into practical use.

Furthermore, when the means for visualizing the three-dimensional image is composed of the three-dimensional image visualization screen $9_3$ made of a photo-refractive material 41, a structure of the whole apparatus can be simplified so as to visualize the three-dimensional image, so that the three-dimensional image display apparatus can be put into practical use.

Further, when the means for visualizing the three-dimensional image includes: the first GLV array 3 of the optical modulator array in which one pixel is composed of a plurality of the GLV pixels 3' [$3_1$', $3_2$', and $3_3$'] and amplitude modulation is performed in common by those plurality of GLV pixels 3' [$3_1$', $3_2$', and $3_3$']; and the second GLV array 4 of the optical deflector array to perform control so that the intermediate images of the plurality of GLV pixels 3' [$3_1$', $3_2$', and $3_3$'] are made to coincide, a structure of the whole apparatus can be simplified so as to visualize the three-dimensional image, so that the three-dimensional image display apparatus can be put into practical use.

When the optical modulator array, that is, the first GLV array 3 of one-dimensional array is disposed along the horizontal direction of a three-dimensional image and the galvanic mirror is disposed to be capable of driving so that a three-dimensional section image can be scanned in the vertical direction of the three-dimensional image, that is, the direction perpendicular to a screen, the three-dimensional image is displayed on the screen in the same state as an actual three-dimensional object, so that a user can observe the three-dimensional image in a natural state.

The invention claimed is:

1. A three-dimensional image display apparatus comprising;
   an optical modulator array that modulates the light intensity of an incident light and an optical deflector array that shifts an image focusing position of each pixel light from said optical modulator array in the direction of an optical axis to form a three-dimensional section image;
   wherein said optical modulator array is formed of a diffraction type array in which a plurality of light reflective films are driven and correspond to light of one pixel; and
   said optical deflector array is formed of an array in which a plurality of light reflective films are driven and correspond to light of one pixel.

2. The three-dimensional image display apparatus according to claim 1, further comprising scanning mirror means for scanning said three-dimensional section image to form a three-dimensional image.

3. The three-dimensional image display apparatus according to claim 2, further comprising means for visualizing said three-dimensional image.

4. The three-dimensional image display apparatus according to claim 3;
   wherein said means for visualizing the three-dimensional image is composed of a Fresnel lens for telecentrically focusing a pixel of the three-dimensional image and a micro-lens array disposed in the vicinity of a mean image plane at a pitch equal to a magnified image of the pixel.

5. The three-dimensional image display apparatus according to claim 3;
   wherein said means for visualizing the three-dimensional image is composed of the Fresnel lens for telecentrically focusing the pixel of the three-dimensional image and a scatterer disposed in the vicinity of the mean image plane.

6. The three-dimensional image display apparatus according to claim 3;
   wherein said means for visualizing the three-dimensional image is composed of a photo-refractive member disposed at a position where said three-dimensional section image is formed.

7. The three-dimensional image display apparatus according to claim 3;
   wherein said means for visualizing the three-dimensional image is composed of the optical modulator array in which a plurality of optical modulators performing amplitude modulation in common correspond to one pixel and the optical deflector array in which an optical deflector corresponds to each of said plurality of optical modulators, and the plurality of images of pixels from each of said optical modulators are made to coincide by said optical deflector.

8. The three-dimensional image display apparatus according to claim 2;
   wherein said optical modulator array is a one-dimensional array to be disposed such that information in the horizontal direction of the three-dimensional image is made to enter and said scanning mirror means is disposed so as to scan the three-dimensional section image in the vertical direction of a display screen.

* * * * *

UNITED STATES PATENT AND TRADEMARK OFFICE
CERTIFICATE OF CORRECTION

PATENT NO.        : 7,204,593 B2
APPLICATION NO.   : 10/502733
DATED             : April 17, 2007
INVENTOR(S)       : Shigeo Kubota et al.

It is certified that error appears in the above-identified patent and that said Letters Patent is hereby corrected as shown below:

Title Page:
Item (54) should be read as follows:
-- THREE-DIMENSIONAL IMAGE DISPLAY APPARATUS --.

Signed and Sealed this

Twenty-fourth Day of July, 2007

JON W. DUDAS
*Director of the United States Patent and Trademark Office*